United States Patent
Imaoka

(10) Patent No.: US 10,816,780 B2
(45) Date of Patent: Oct. 27, 2020

(54) LENS SYSTEM, AND IMAGE PROJECTION APPARATUS AND IMAGING APPARATUS THAT INCLUDE THE SAME

(71) Applicant: Panasonic Intellectual Property Management Co., Ltd., Osaka (JP)

(72) Inventor: Takuya Imaoka, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/912,595

(22) Filed: Mar. 6, 2018

(65) Prior Publication Data
US 2018/0284408 A1    Oct. 4, 2018

(30) Foreign Application Priority Data

Mar. 29, 2017 (JP) .................. 2017-064398
Feb. 22, 2018 (JP) .................. 2018-029418

(51) Int. Cl.
 *G02B 13/16* (2006.01)
 *G02B 27/00* (2006.01)
 (Continued)

(52) U.S. Cl.
 CPC ............. *G02B 13/16* (2013.01); *G02B 15/20* (2013.01); *G02B 27/0025* (2013.01);
 (Continued)

(58) Field of Classification Search
 CPC ........ G02B 13/16; G02B 27/18; G02B 13/04; G02B 27/0025; G02B 27/0043; G02B 27/0955; G02B 13/06
 (Continued)

(56) References Cited

U.S. PATENT DOCUMENTS

| 2005/0088762 A1* | 4/2005 | Ohashi | G02B 13/06 359/754 |
| 2011/0002034 A1 | 1/2011 | Shimo et al. | |

(Continued)

FOREIGN PATENT DOCUMENTS

| JP | 2013-033283 | 2/2013 |
| JP | 2014-029392 | 2/2014 |

(Continued)

*Primary Examiner* — Jordan M Schwartz
(74) *Attorney, Agent, or Firm* — Wenderoth, Lind & Ponack, L.L.P.

(57) ABSTRACT

The lens system forms an image conjugately between each of a magnification conjugate point and a reduction conjugate point; and an intermediate image-forming position. The lens system includes a magnification optical system with positive power, the magnification optical system having a plurality of lens elements and positioned closer to the magnification side than the intermediate image-forming position; and a relay optical system with positive power, the relay optical system having a plurality of lens elements and positioned closer to the reduction side than the intermediate image-forming position. The lens system satisfies following conditions (1) and (2).

$$0.08 \leq fp/fr \leq 0.8 \quad (1)$$

$$\{Y\max - ft \cdot \tan(\omega\max)\}/\{ft \cdot \tan(\omega\max)\} \leq -0.3 \quad (2)$$

where
fr is composite focal length of the relay optical system,
fp is composite focal length of the magnification optical system,
Ymax is a radius of an effective image diameter,
ωmax is a maximum half view angle, and
ft is the focal length of the lens system.

10 Claims, 33 Drawing Sheets

(51) Int. Cl.
*G02B 27/18* (2006.01)
*G02B 15/20* (2006.01)
*G02B 27/09* (2006.01)
*G03B 21/14* (2006.01)

(52) U.S. Cl.
CPC ......... *G02B 27/0955* (2013.01); *G02B 27/18* (2013.01); *G03B 21/14* (2013.01)

(58) Field of Classification Search
USPC ......................................... 359/649–651, 725
See application file for complete search history.

(56) References Cited

U.S. PATENT DOCUMENTS

| | | |
|---|---|---|
| 2014/0036142 A1 | 2/2014 | Inoko |
| 2014/0204351 A1 | 7/2014 | Matsuo |
| 2015/0077848 A1* | 3/2015 | Ichimura ................ G02B 13/16 359/434 |
| 2016/0112685 A1 | 4/2016 | Matsuo |
| 2018/0307041 A1* | 10/2018 | Masui ................ G02B 27/0081 |

FOREIGN PATENT DOCUMENTS

| | | |
|---|---|---|
| JP | 2015-060062 | 3/2015 |
| WO | 2009/107553 | 9/2009 |

* cited by examiner

LENS SYSTEM, AND IMAGE PROJECTION APPARATUS AND IMAGING APPARATUS THAT INCLUDE THE SAME

BACKGROUND

1. Technical Field

The present disclosure relates to a lens system that forms an image by means of a series of lenses including multiple lens elements, and to an image projection apparatus and an imaging apparatus that include the lens system.

2. Description and the Related Art

Patent literature 1 discloses a magnified-projection optical system that includes a projection optical system, a relay optical system, and a display element disposed in order from the screen side along the optical axis. The projection optical system magnify-projects an image primarily formed by the relay optical system onto a screen. The magnified-projection optical system includes a negative group with negative optical power and a positive group with positive optical power that are disposed in order from the screen side. This magnified-projection optical system provides a greatly long back focus despite its short focal length, as well as a small color aberration.

CITATION LIST

Patent Literature

PTL 1: WO 2009/107553

SUMMARY

The present disclosure provides a lens system with a small lens diameter while suppressing various aberrations, and an image projection apparatus and an imaging apparatus that include the lens system.

The lens system that forms an image conjugately between each of a magnification conjugate point at a magnification side and a reduction conjugate point at a reduction side; and an intermediate image-forming position inside the lens system. The lens system includes a magnification optical system with positive power, the magnification optical system having a plurality of lens elements, the magnification optical system positioned closer to the magnification side than the intermediate image-forming position; and a relay optical system with positive power, the relay optical system having a plurality of lens elements, the relay optical system positioned closer to the reduction side than the intermediate image-forming position. The lens system satisfies following conditions (1) and (2).

$$0.08 \leq fp/fr \leq 0.8 \tag{1}$$

$$\{Y_{max} - ft \cdot \tan(\omega_{max})\} / \{ft \cdot \tan(\omega_{max})\} \leq -0.3 \tag{2}$$

where
fr is composite focal length of the relay optical system closer to the reduction side than the intermediate image-forming position,
fp is composite focal length of the magnification optical system closer to the magnification side than the intermediate image-forming position,
Ymax is a radius of an effective image diameter,
ωmax is a maximum half view angle, and
ft is the focal length of the lens system as a whole.

The image projection apparatus according to the disclosure includes the lens system described above and an image-forming element generating an image to be projected onto a screen.

The imaging apparatus according to the disclosure includes the lens system described above, and an imaging element photoreceiving an optical image formed by the lens system and converting the optical image to an electrical image signal.

The disclosure provides a lens system with a small lens diameter while suppressing various aberrations.

DETAILED DESCRIPTION OF PREFERRED EMBODIMENTS

Hereinafter, a detailed description is made of some embodiments with reference to the related drawings as appropriate. However, a detailed description more than necessary may be omitted, such as a description of a well-known item and a duplicate description for a substantially identical component, to avoid an unnecessarily redundant description and to allow those skilled in the art to easily understand the following description.

Note that the accompanying drawings and the following description are provided for those skilled in the art to well understand the disclosure and it is not intended that the drawings and the description limit the subjects described in the claims.

Figure 1:
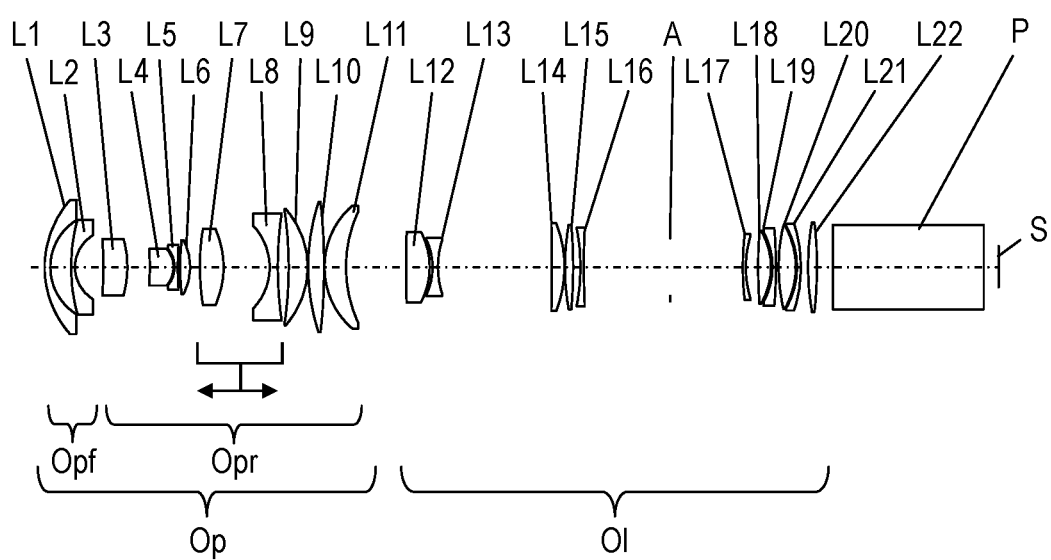
FIG. 1 is a lens layout diagram illustrating a lens system according to the first exemplary embodiment, in a focusing state for a projection distance of 4,000 mm.
Figure 4:
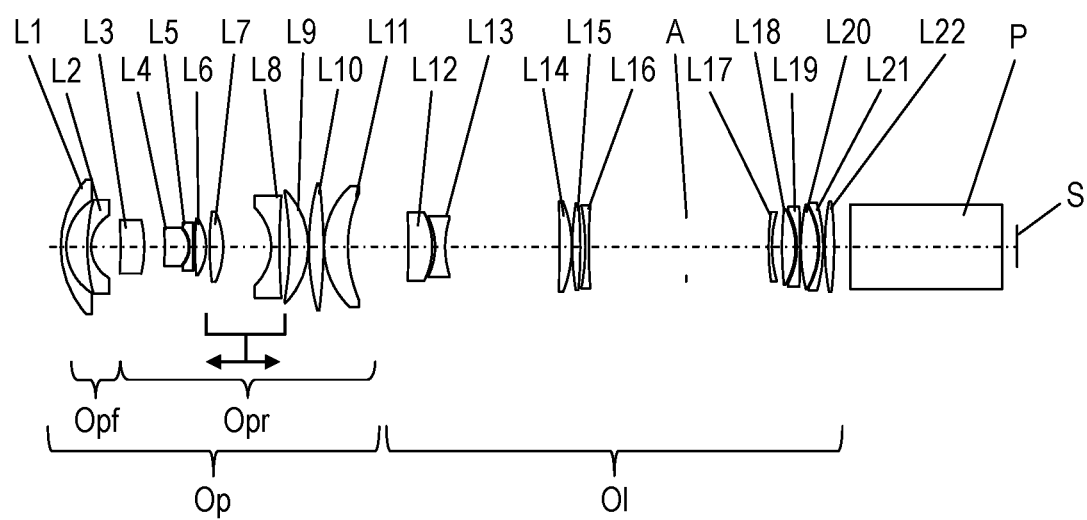
FIG. 4 is a lens layout diagram illustrating a lens system according to the second exemplary embodiment, in a focusing state for a projection distance of 4,000 mm.
Figure 7:
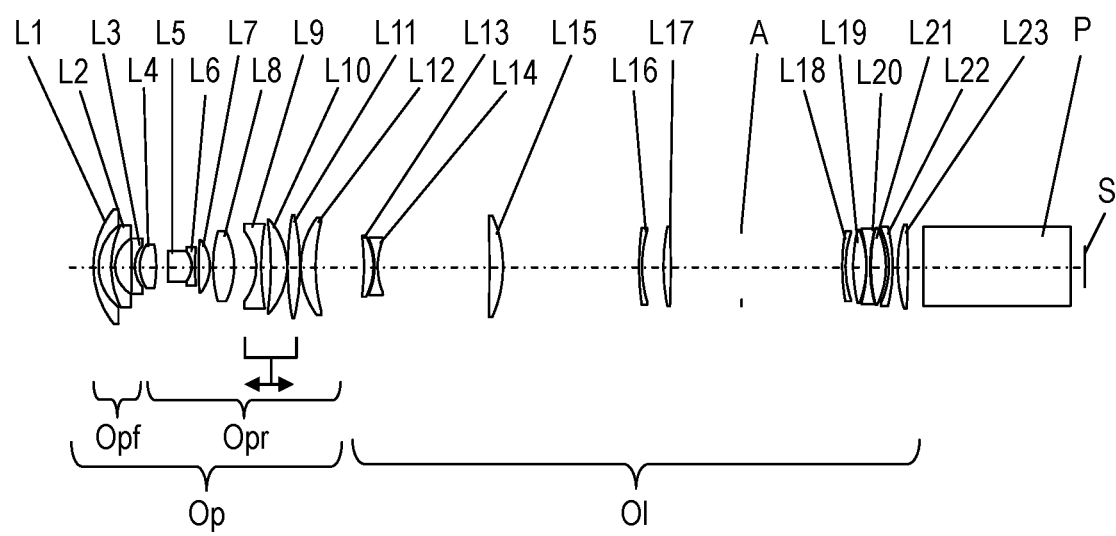
FIG. 7 is a lens layout diagram illustrating a lens system according to the third exemplary embodiment, in a focusing state for a projection distance of 4,000 mm.
Figure 10:
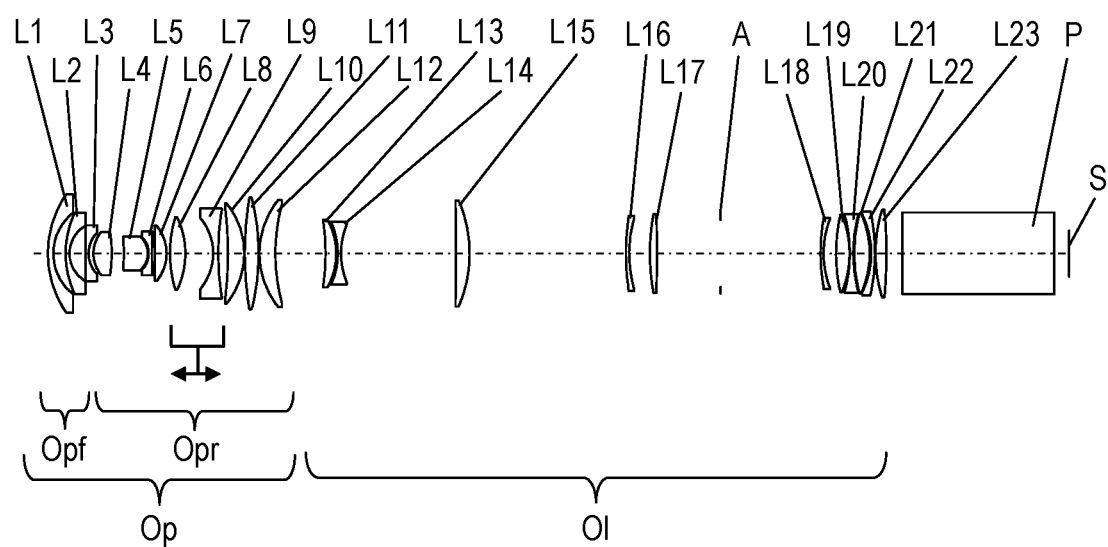
FIG. 10 is a lens layout diagram of a lens system according to the fourth exemplary embodiment, in a focusing state for a projection distance of 4,000 mm.
Figure 13:
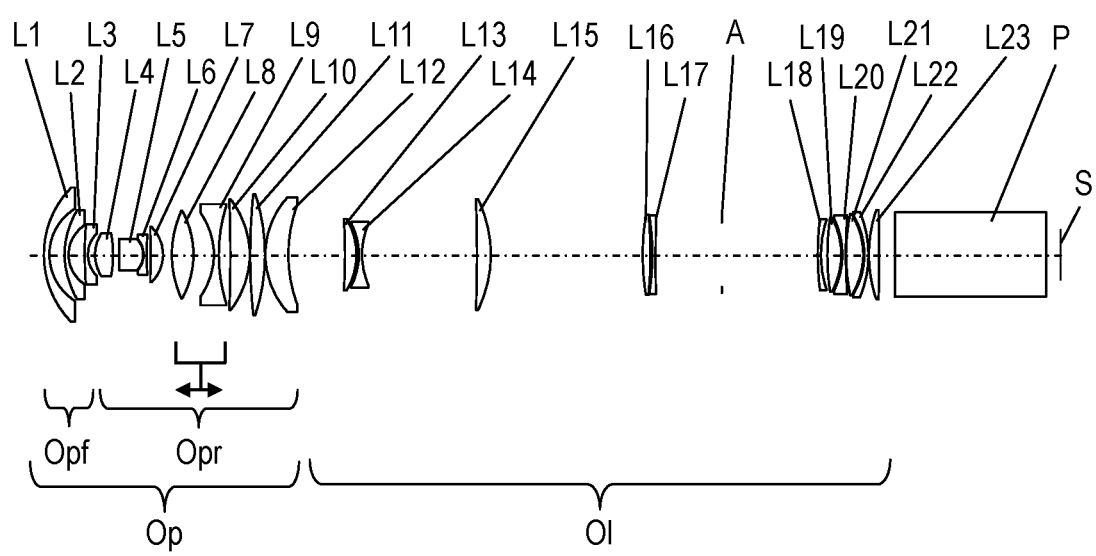
FIG. 13 is a lens layout diagram of a lens system according to the fifth exemplary embodiment, in a focusing state for a projection distance of 4,000 mm.
Figure 16:
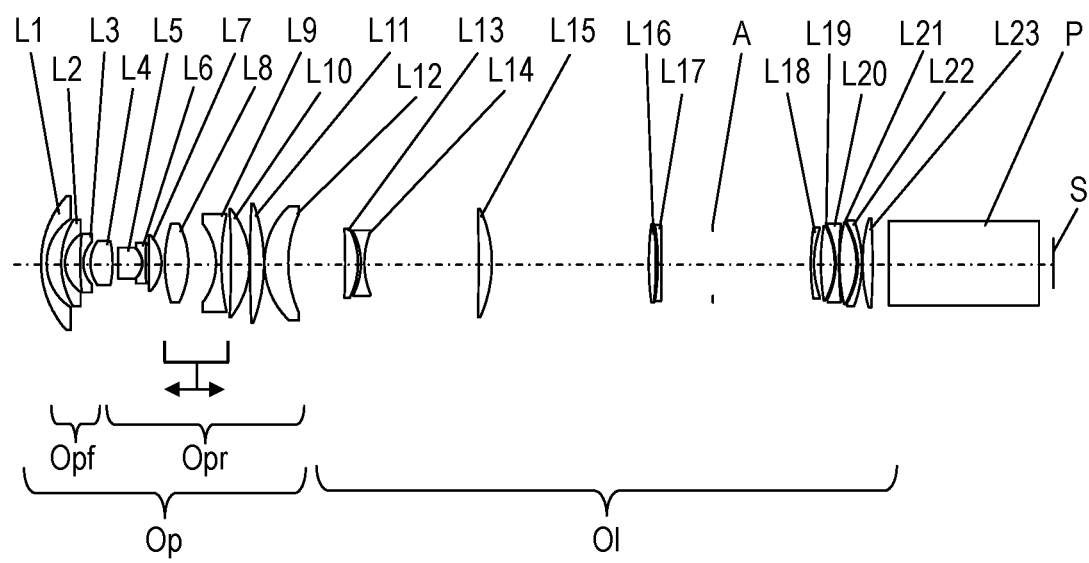
FIG. 16 is a lens layout diagram of a lens system according to the sixth exemplary embodiment, in a focusing state for a projection distance of 4,000 mm.
Figure 19:
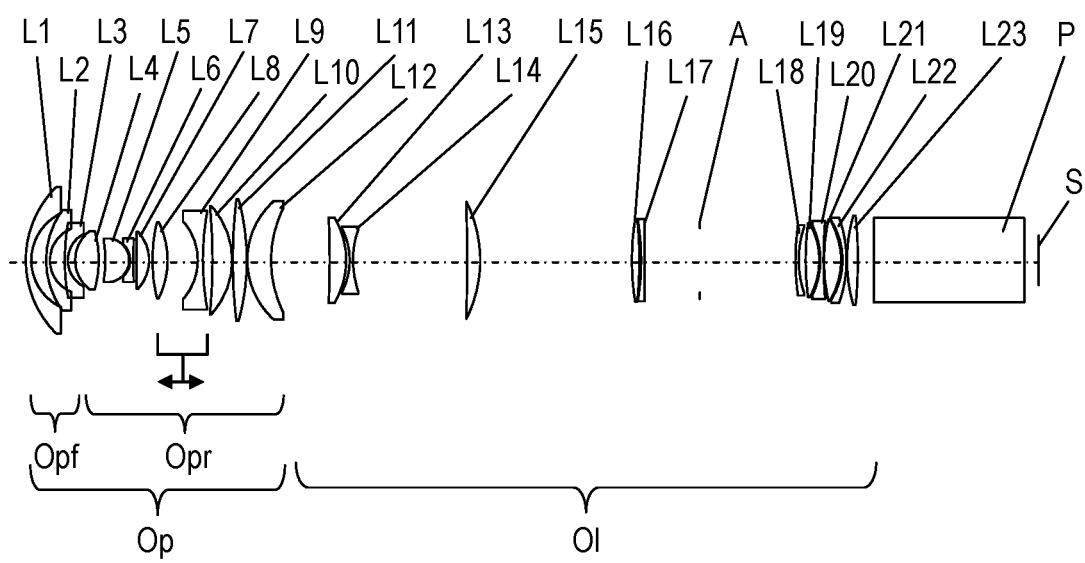
FIG. 19 is a lens layout diagram of a lens system according to the seventh exemplary embodiment, in a focusing state for a projection distance of 4,000 mm.
Figure 22:
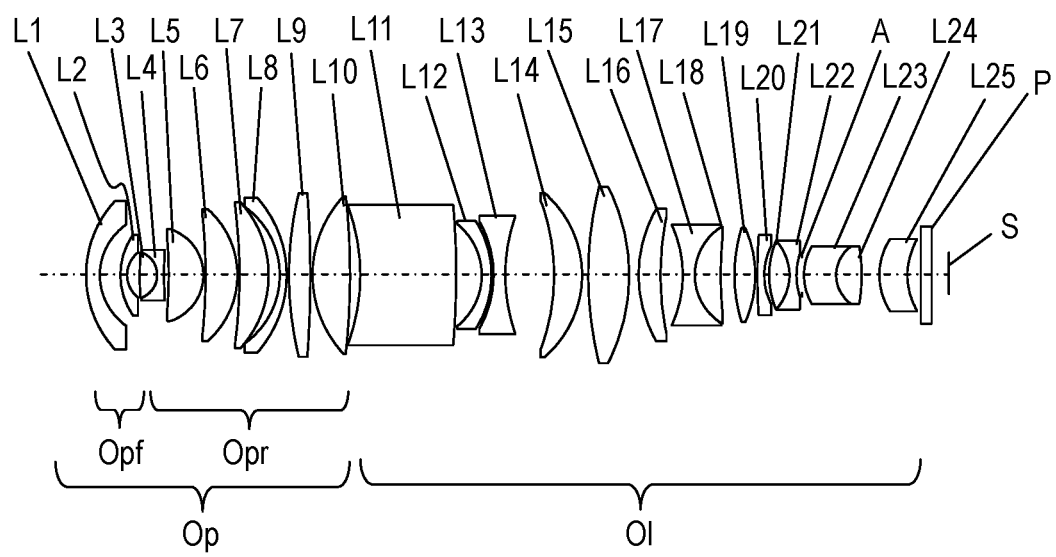
FIG. 22 is a lens layout diagram of a lens system according to the eighth exemplary embodiment, in a focusing state for a projection distance of 4,000 mm.
Figure 25:
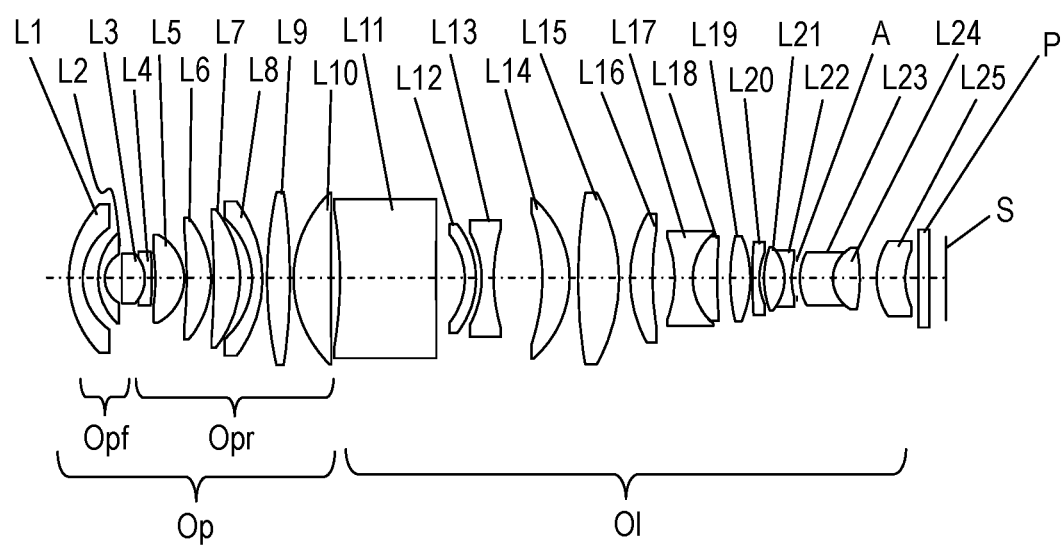
FIG. 25 is a lens layout diagram of a lens system according to the ninth exemplary embodiment, in a focusing state for a projection distance of 4,000 mm.
Figure 28:
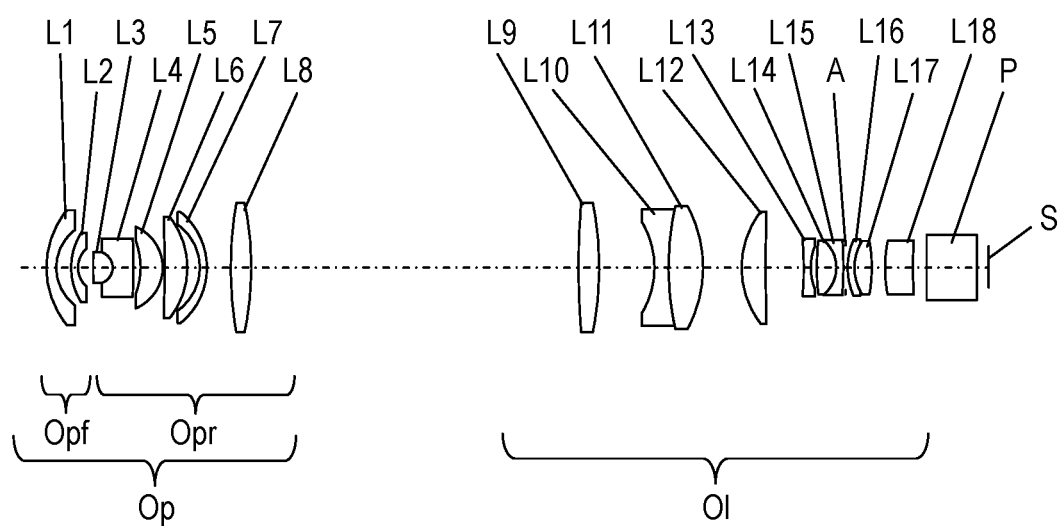
FIG. 28 is a lens layout diagram of a lens system according to the tenth exemplary embodiment, in a focusing state for a projection distance of 4,000 mm.
Figure 31:
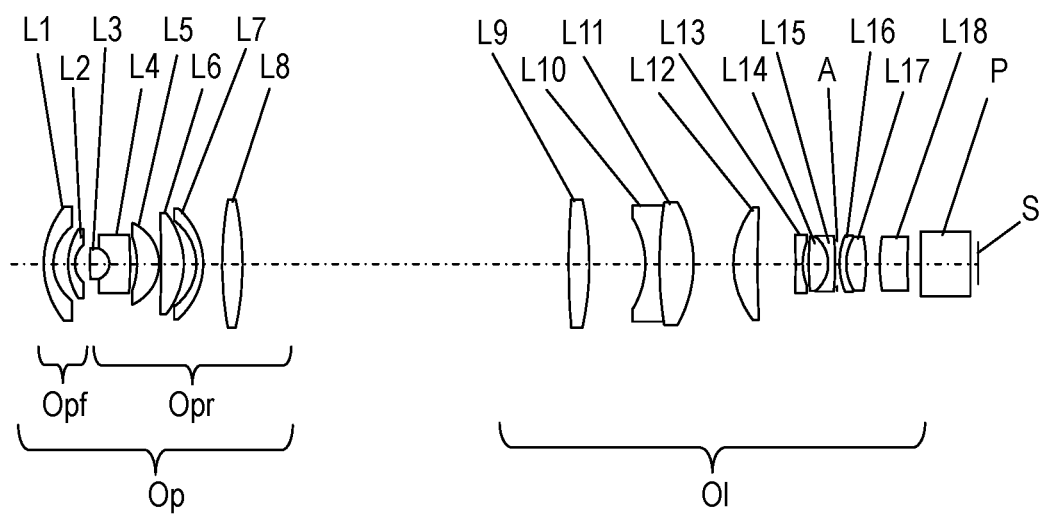
FIG. 31 is a lens layout diagram of a lens system according to the eleventh exemplary embodiment, in a focusing state for a projection distance of 4,000 mm.

FIGS. 1, 4, 7, 10, 13, 16, 19, 22, 25, 28 and 31 are respectively lens layout diagrams of the lens systems according to the exemplary embodiments first through eleventh. When focusing, the entire lens system moves in the optical axis direction. In FIGS. 1, 4, 7, 10, 13, 16, and 19, the arrow under the lens groups indicates an image surface curvature correction lens group that moves along the optical axis when adjusting the amount of image surface curvature, where the group moves toward the magnification side or reduction side depending on the object distance and the curvature radius of the screen surface.

In the respective figures, the image-forming position at the magnification side is on the left; that at the reduction side is on the right. In the respective figures, the rightmost (the reduction side) straight line indicates the position of original image S. On the left (the magnification side) of original image S, optical element P is positioned. Optical element P represents an optical element such as a prism for color separation/synthesis, optical filter, parallel plain-plate glass, crystal low-pass filter, and infrared-cut filter. Here, if a lens element with negative power and that with positive power are joined together, the total power of the cemented lens determines positive or negative power.

Figure 2:
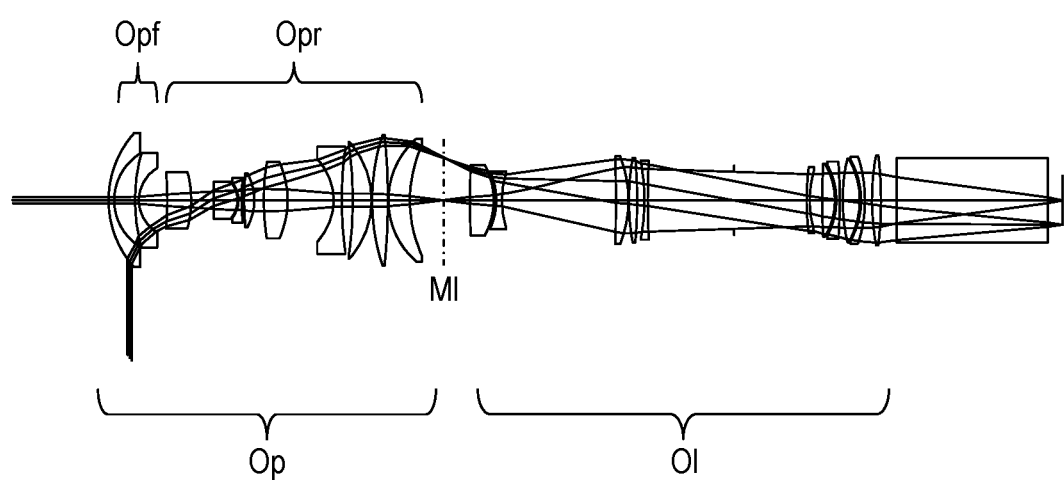
FIG. 2 is a lens layout diagram illustrating the optical path of the lens system according to the first exemplary embodiment.
Figure 5:
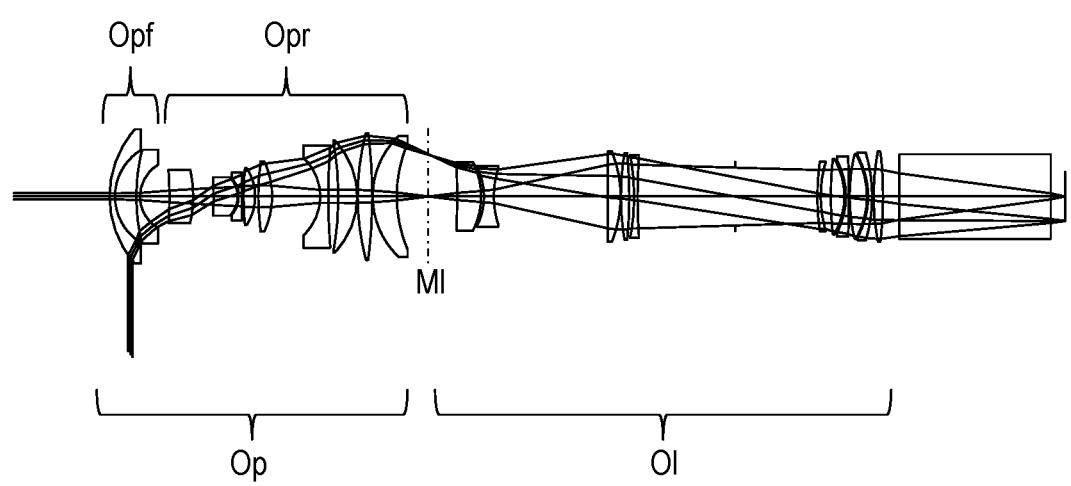
FIG. 5 is a lens layout diagram illustrating the optical path of the lens system according to the second exemplary embodiment.
Figure 8:
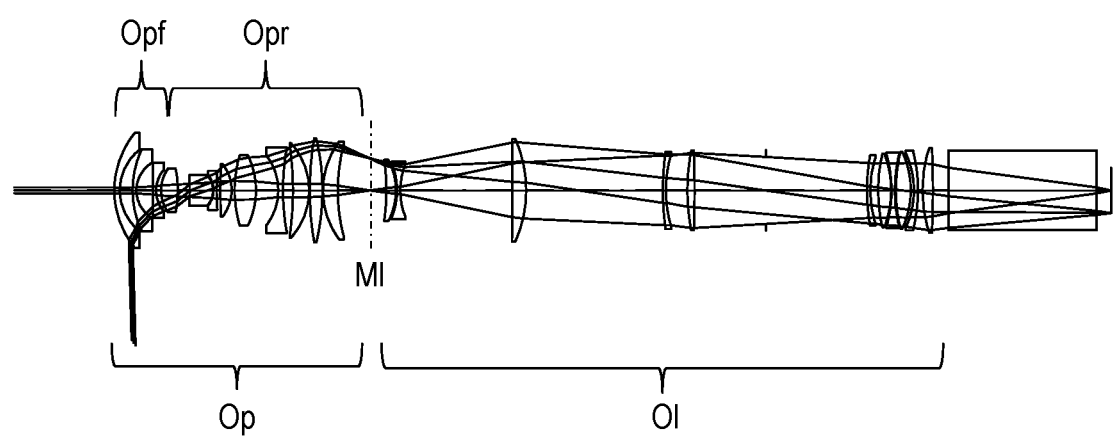
FIG. 8 is a lens layout diagram illustrating the optical path of the lens system according to the third exemplary embodiment.
Figure 11:
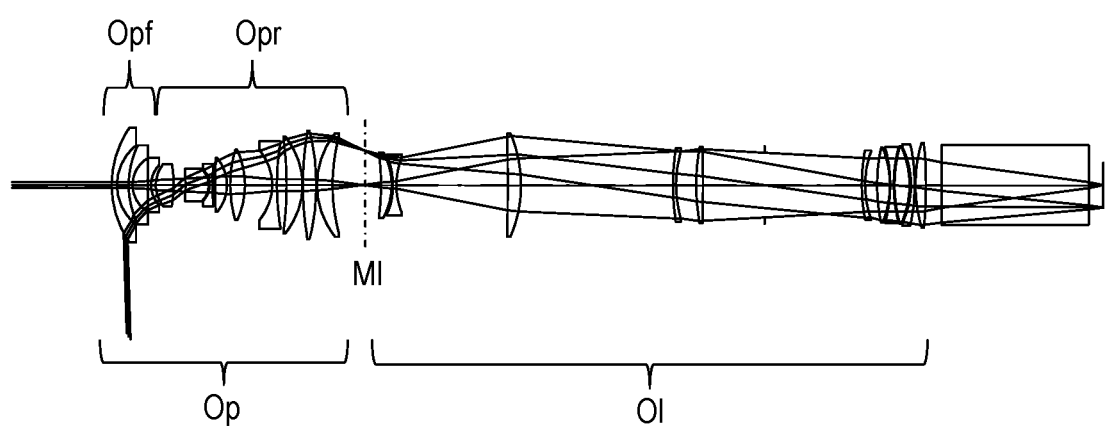
FIG. 11 is a lens layout diagram illustrating the optical path of the lens system according to the fourth exemplary embodiment.
Figure 14:
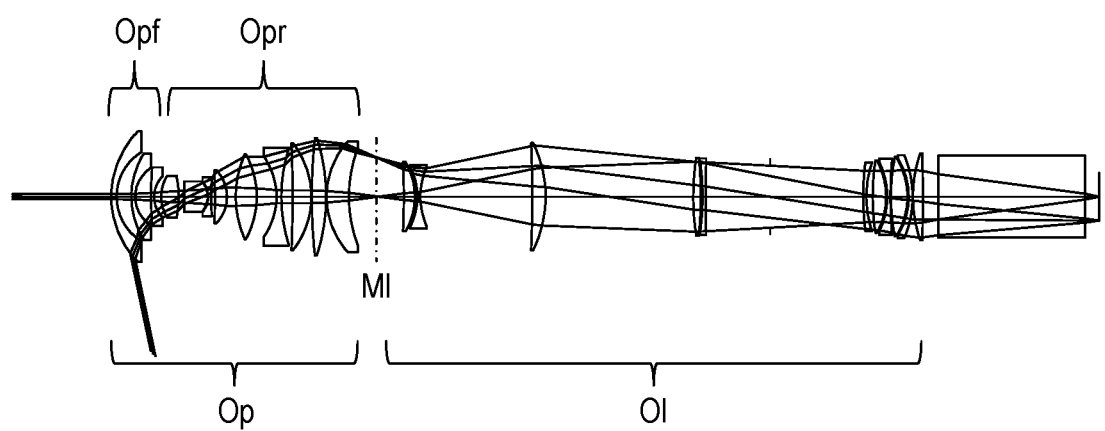
FIG. 14 is a lens layout diagram illustrating the optical path of the lens system according to the fifth exemplary embodiment.
Figure 17:
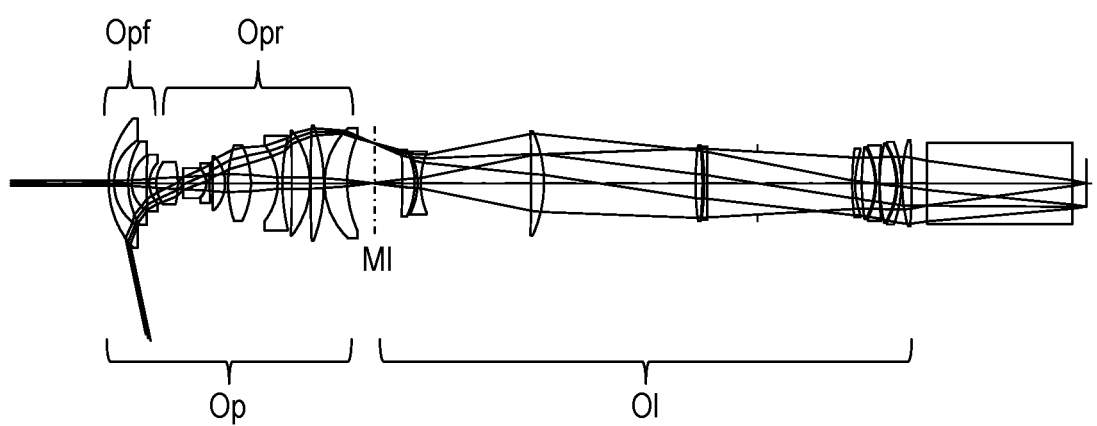
FIG. 17 is a lens layout diagram illustrating the optical path of the lens system according to the sixth exemplary embodiment.
Figure 20:
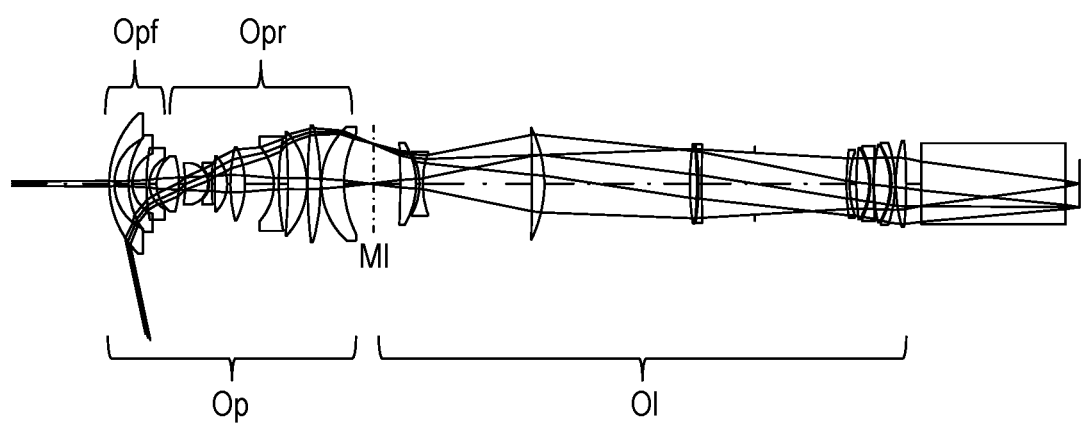
FIG. 20 is a lens layout diagram illustrating the optical path of the lens system according to the seventh exemplary embodiment.
Figure 23:
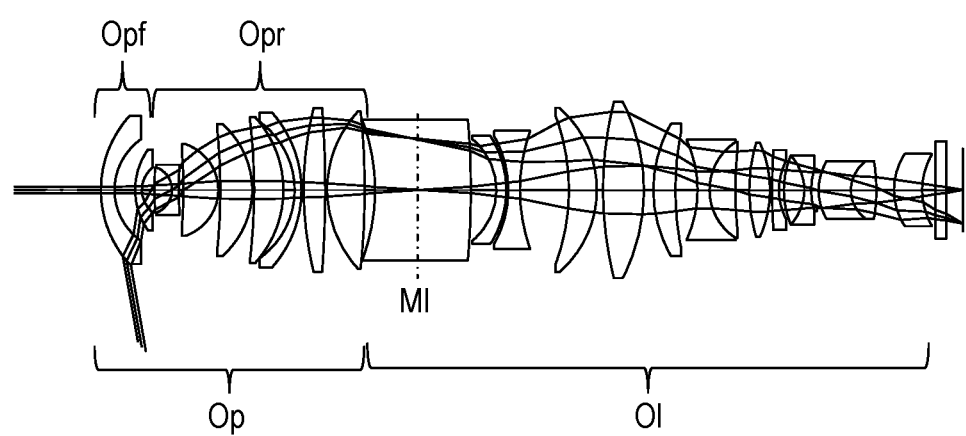
FIG. 23 is a lens layout diagram illustrating the optical path of the lens system according to the eighth exemplary embodiment.
Figure 26:
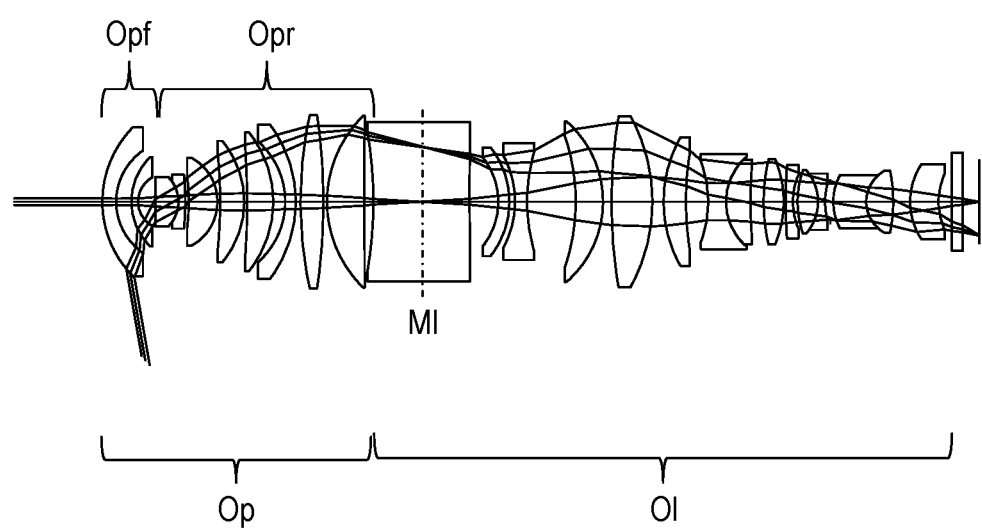
FIG. 26 is a lens layout diagram illustrating the optical path of the lens system according to the ninth exemplary embodiment.
Figure 29:
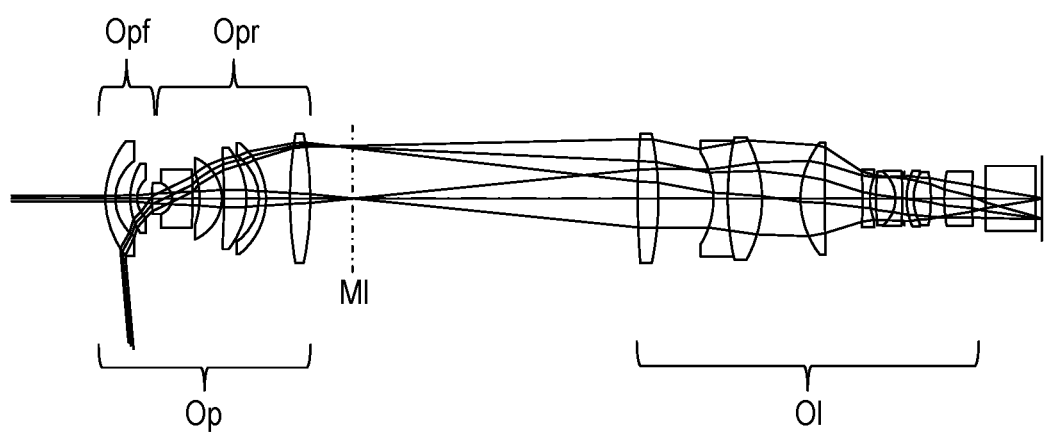
FIG. 29 is a lens layout diagram illustrating the optical path of the lens system according to the tenth exemplary embodiment.
Figure 32:
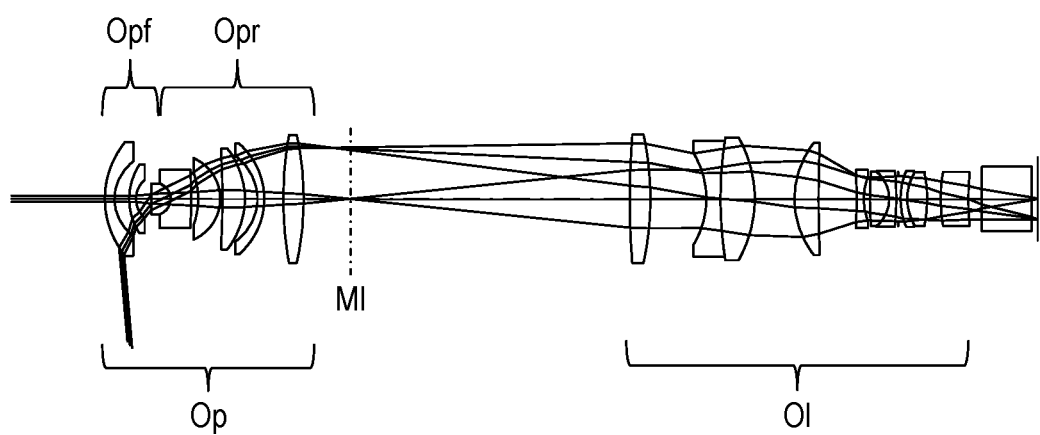
FIG. 32 is a lens layout diagram illustrating the optical path of the lens system according to the eleventh exemplary embodiment.

FIGS. 2, 5, 8, 11, 14, 17, 20, 23, 26, 29, and 32 are respectively optical sectional views of the optical paths of the lens systems according to the exemplary embodiments first through eleventh. The magnification side corresponds to magnification optical system Op and the reduction side corresponds to relay optical system Ol with intermediate image-forming position MI being a boundary. Here, if intermediate image-forming position MI is inside a lens element, the lens is included in relay optical system Ol. A lens system according to the present disclosure conjugates each of the magnification conjugate point (the projected image) at the magnification side and the reduction conjugate point (original image S) at the reduction side; with intermediate image-forming position MI inside the lens system.

Magnification optical system Op is composed of front group Opf (a magnification optical system) and rear group Opr (a magnification optical system). Front group Opf is a lens group closer to the magnification side than the lens element with positive power closest to the magnification side. Rear group Opr is a lens group, including the lens element with positive power closest to the magnification side, is a lens group closer to the reduction side. Here, if a cemented lens is positioned at the boundary between front group Opf and rear group Opr, the cemented lens belongs to rear group Opr when the total power is positive; the cemented lens belongs to front group Opf when the total power is negative.

Figure 3:
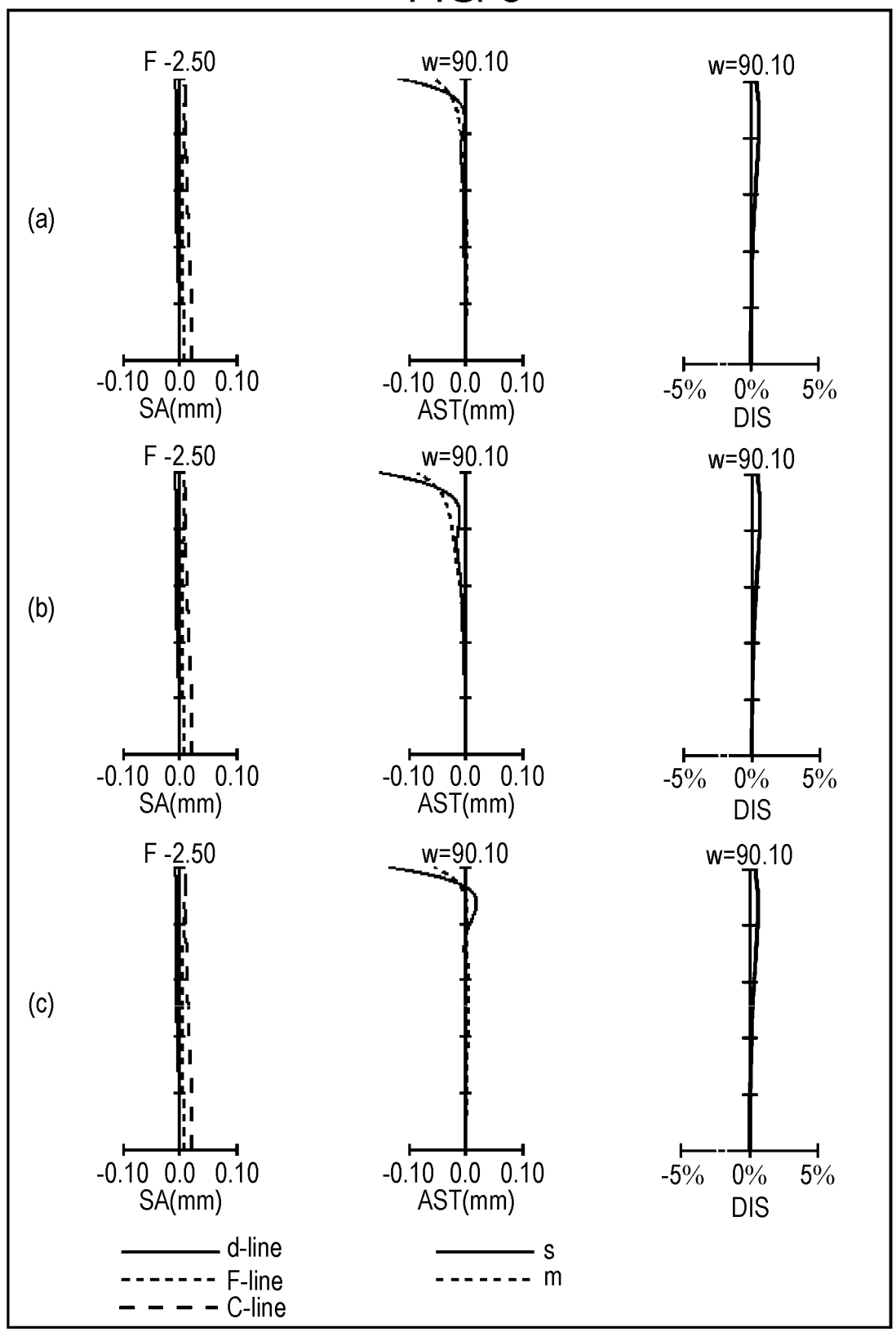
FIG. 3 is a longitudinal aberration diagram of the lens system according to the first exemplary embodiment.
Figure 6:
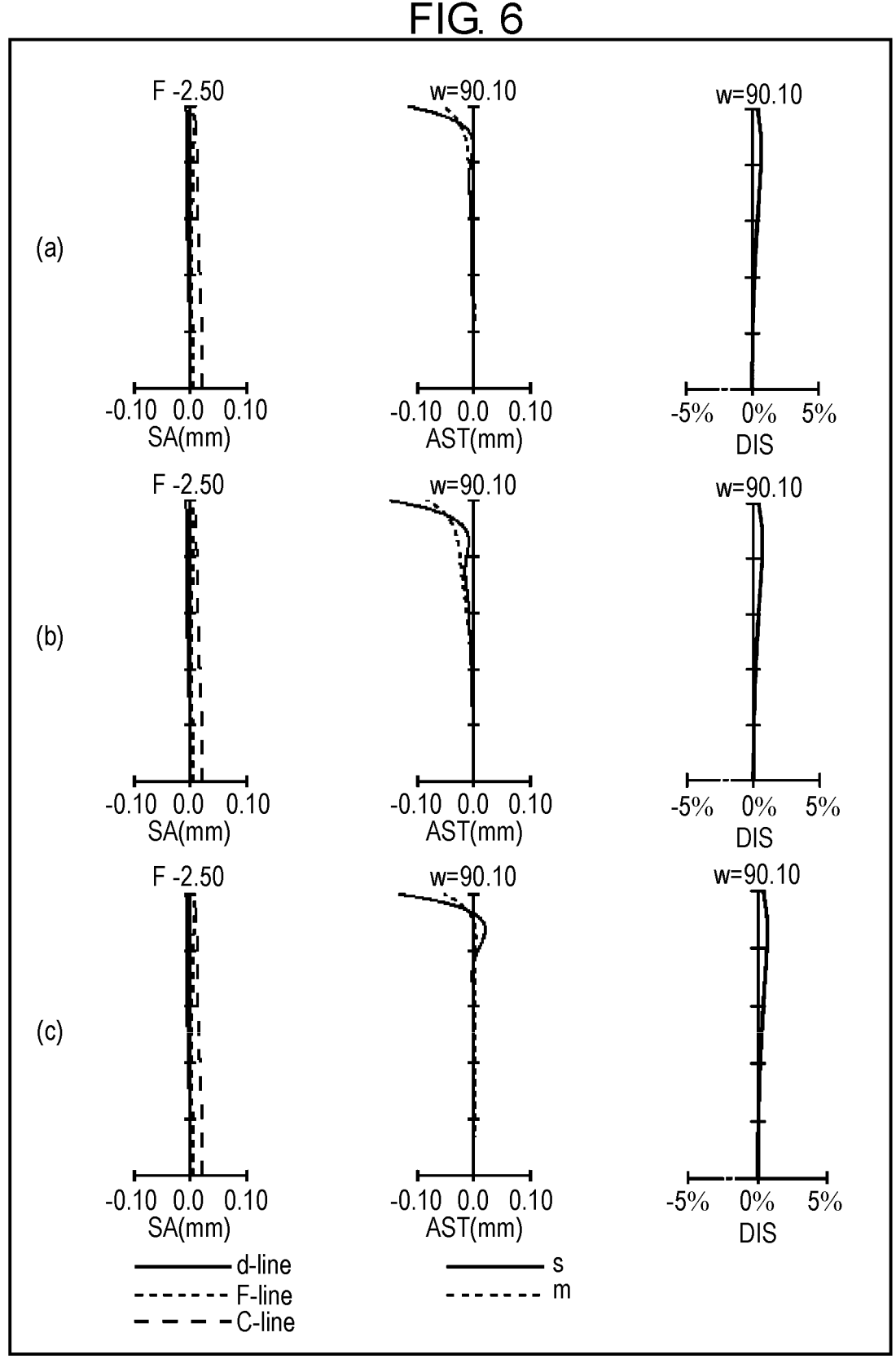
FIG. 6 is a longitudinal aberration diagram of the lens system according to the second exemplary embodiment.
Figure 9:
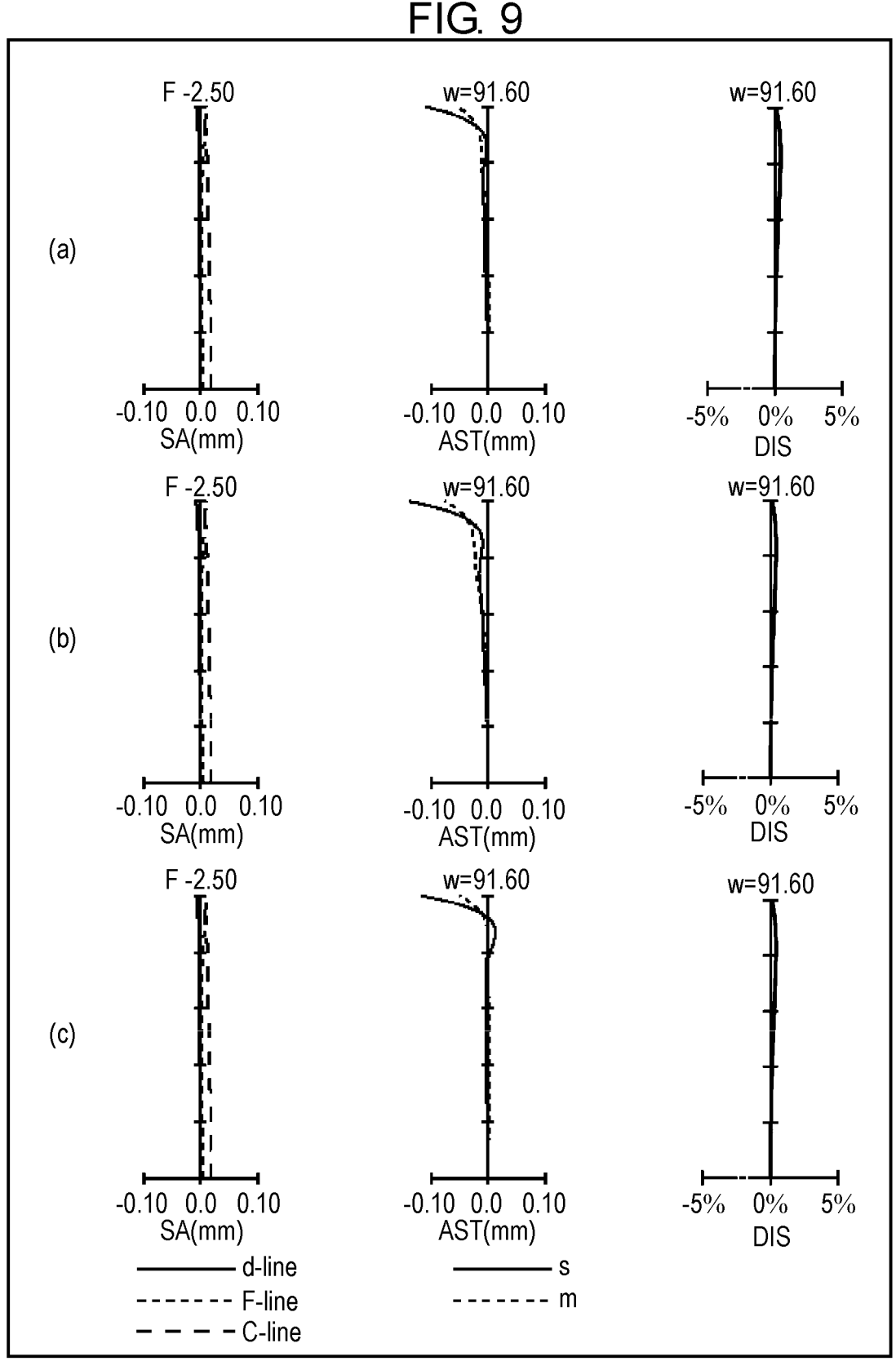
FIG. 9 is a longitudinal aberration diagram of the lens system according to the third exemplary embodiment.
Figure 12:
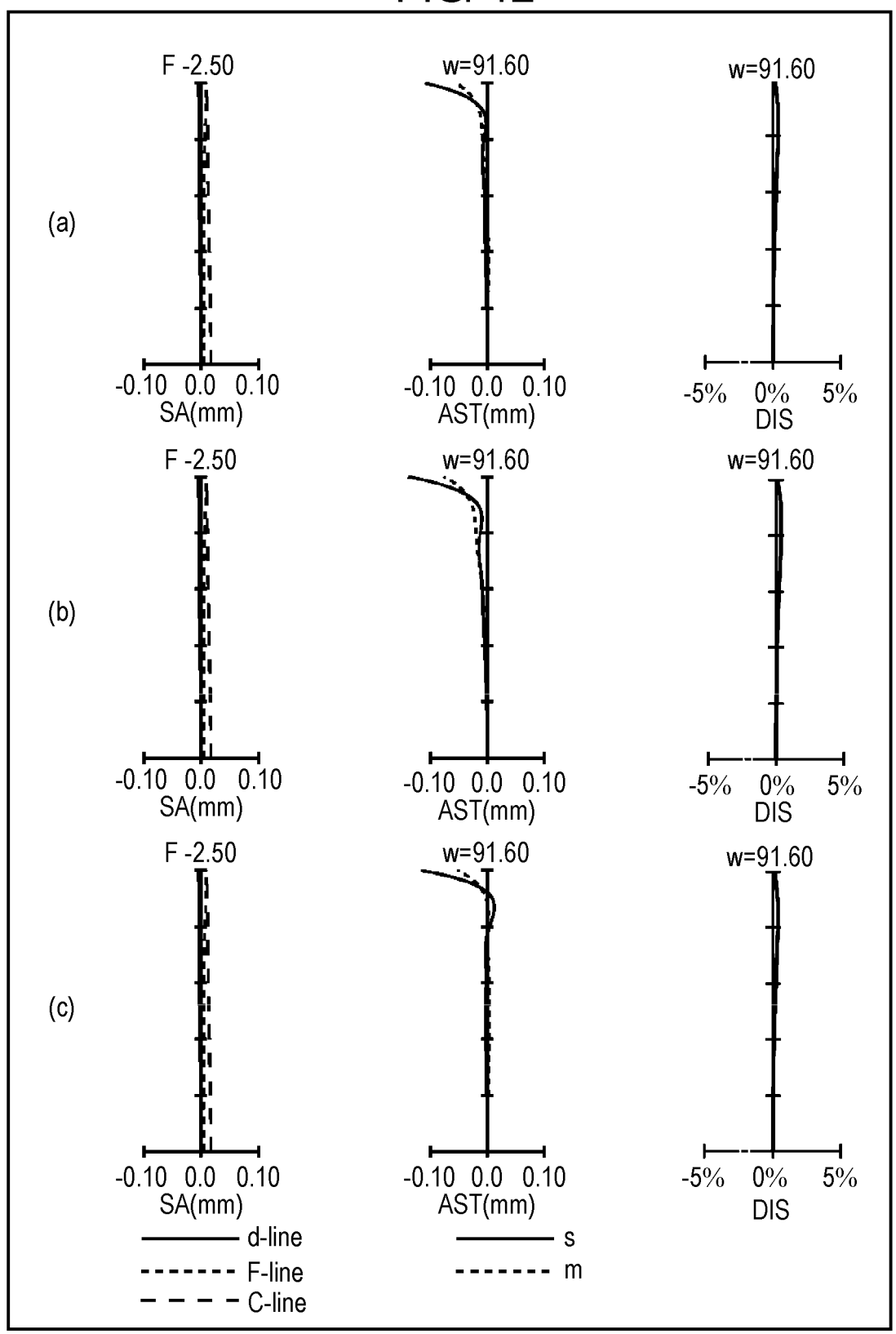
FIG. 12 is a longitudinal aberration diagram of the lens system according to the fourth exemplary embodiment.
Figure 15:
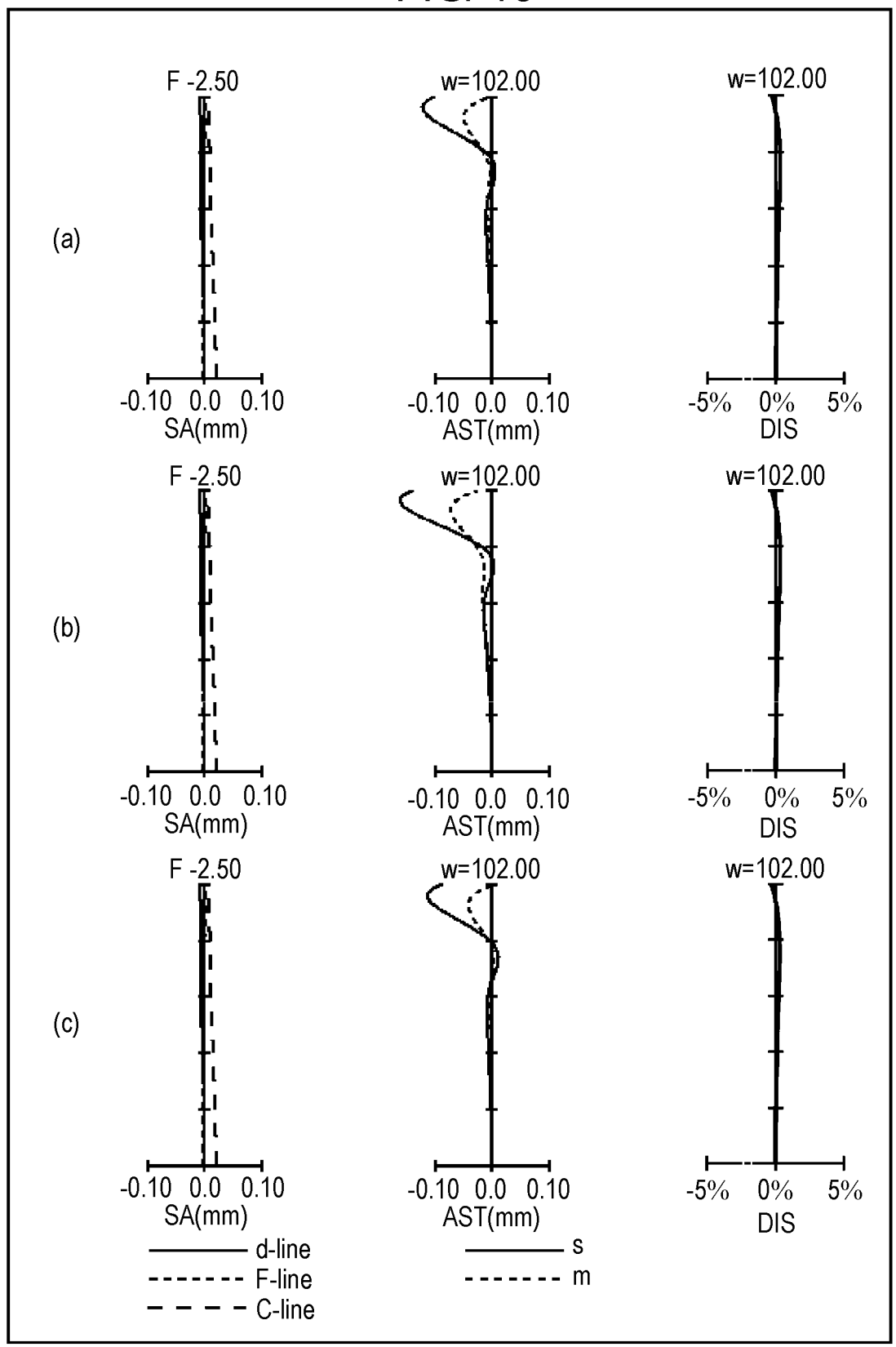
FIG. 15 is a longitudinal aberration diagram of the lens system according to the fifth exemplary embodiment.
Figure 18:
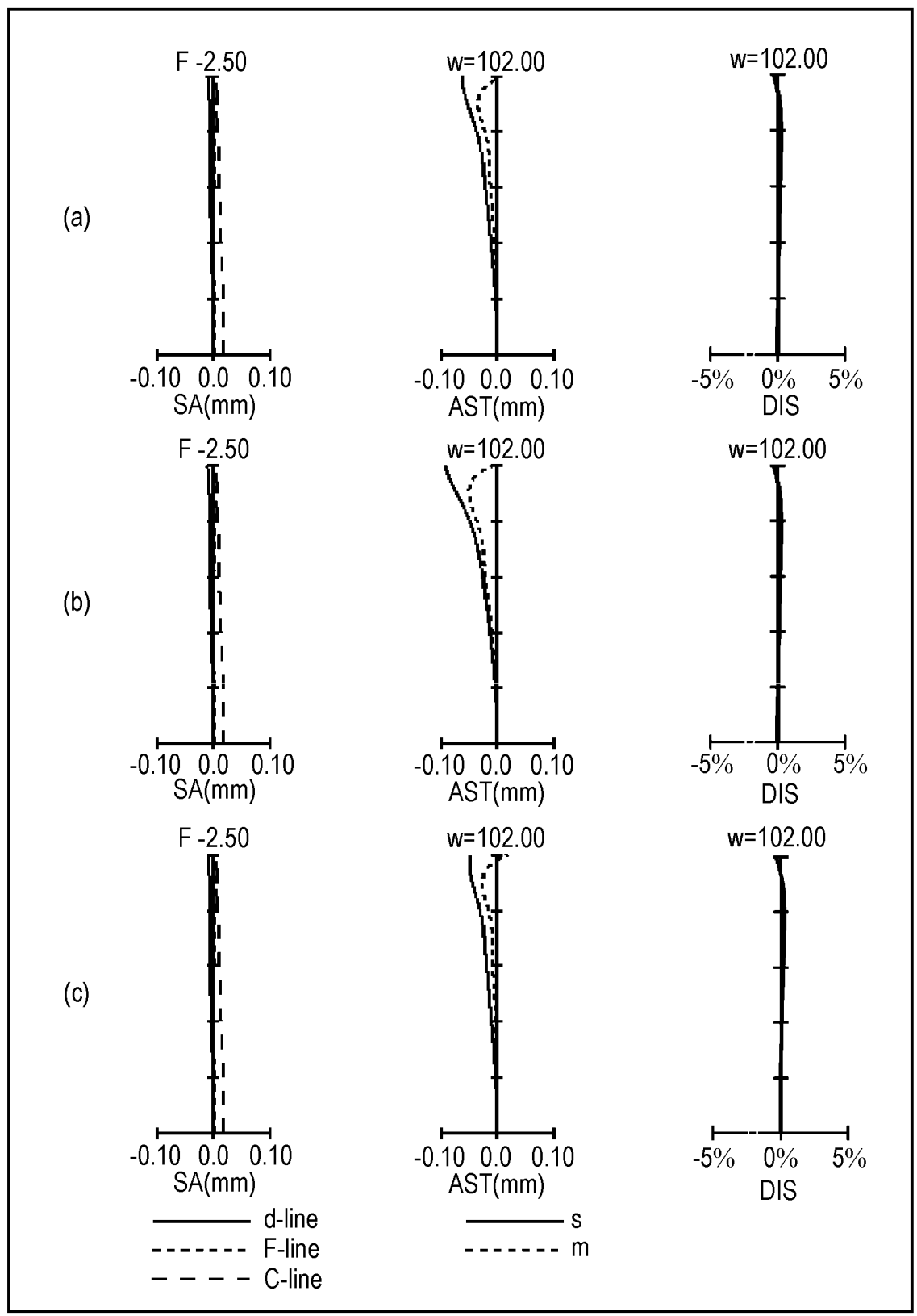
FIG. 18 is a longitudinal aberration diagram of the lens system according to the sixth exemplary embodiment.
Figure 21:
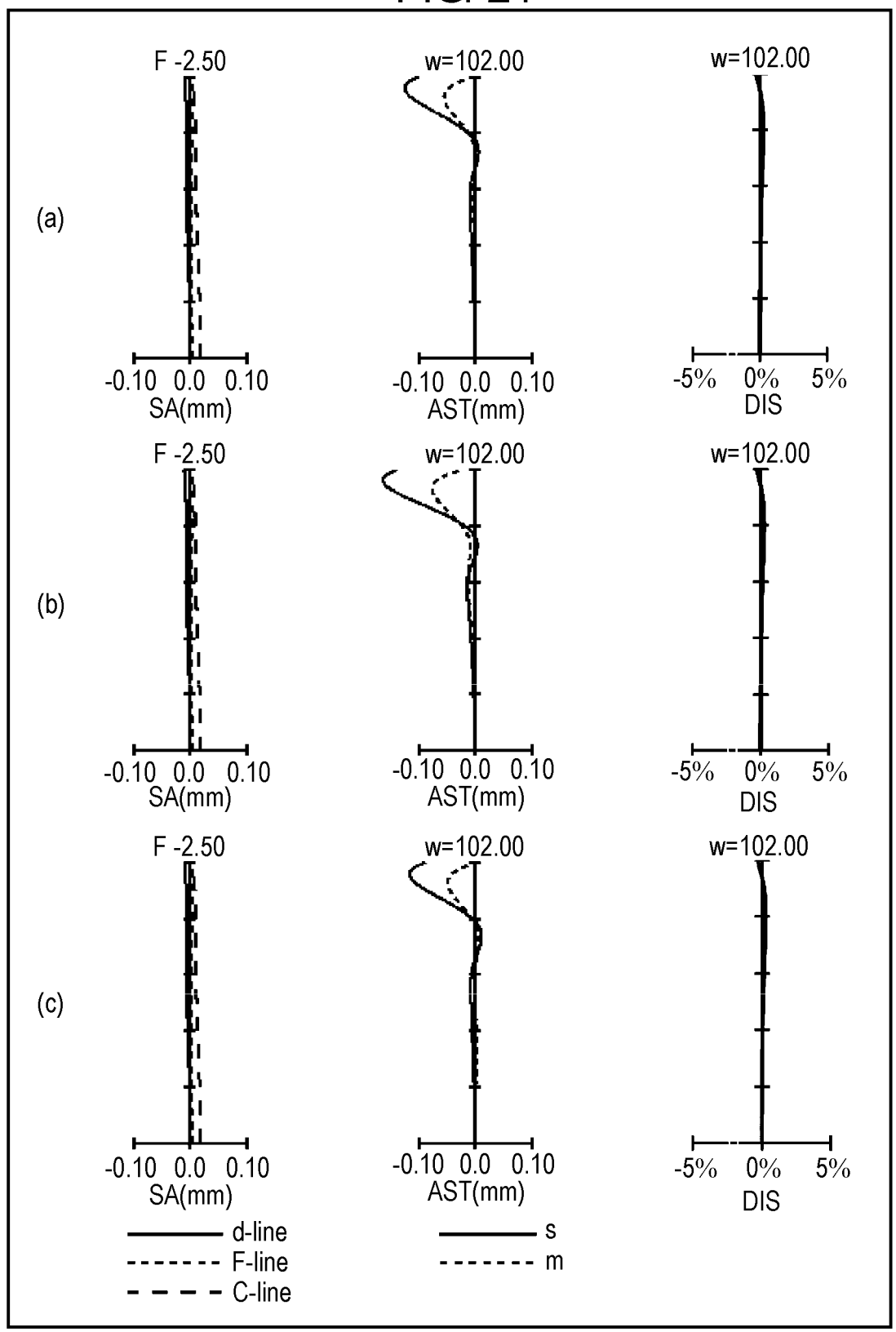
FIG. 21 is a longitudinal aberration diagram of the lens system according to the seventh exemplary embodiment.

FIGS. 3, 6, 9, 12, 15, 18, and 21 are respectively longitudinal aberration diagrams according to the exemplary embodiments first through seventh. Symbols (a), (b), and (c) in the figures respectively represent longitudinal aberration diagrams for object distances of the lens system according to the disclosure of 4,000 mm, 2,000 mm, and 7,000 mm.

Figure 24:
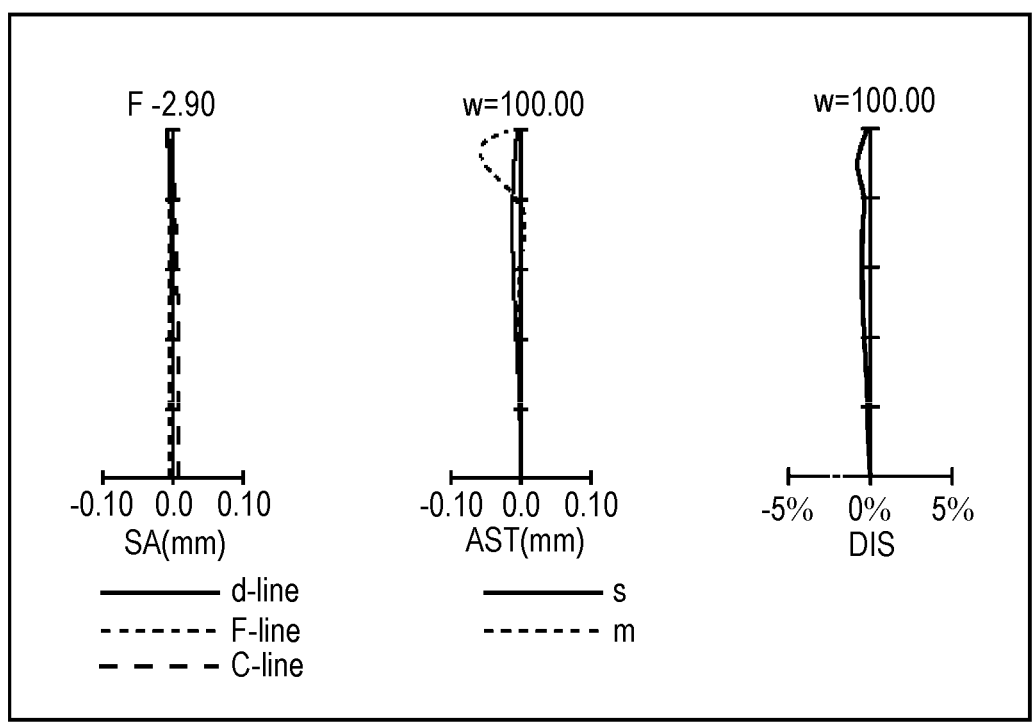
FIG. 24 is a longitudinal aberration diagram of the lens system according to the eighth exemplary embodiment.
Figure 27:
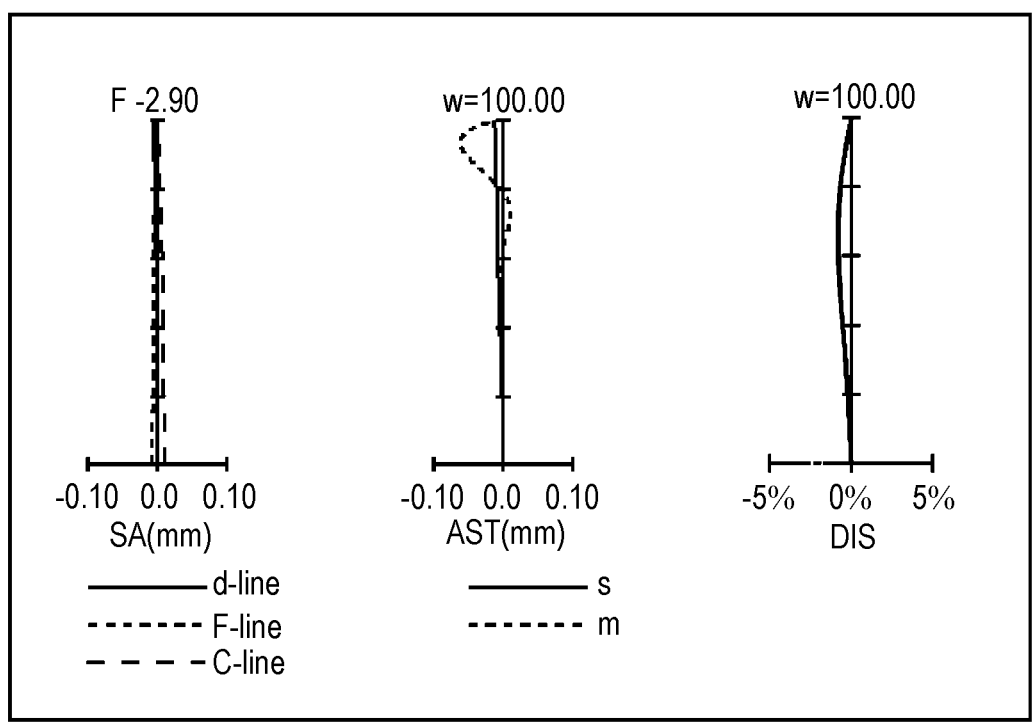
FIG. 27 is a longitudinal aberration diagram of the lens system according to the ninth exemplary embodiment.
Figure 30:
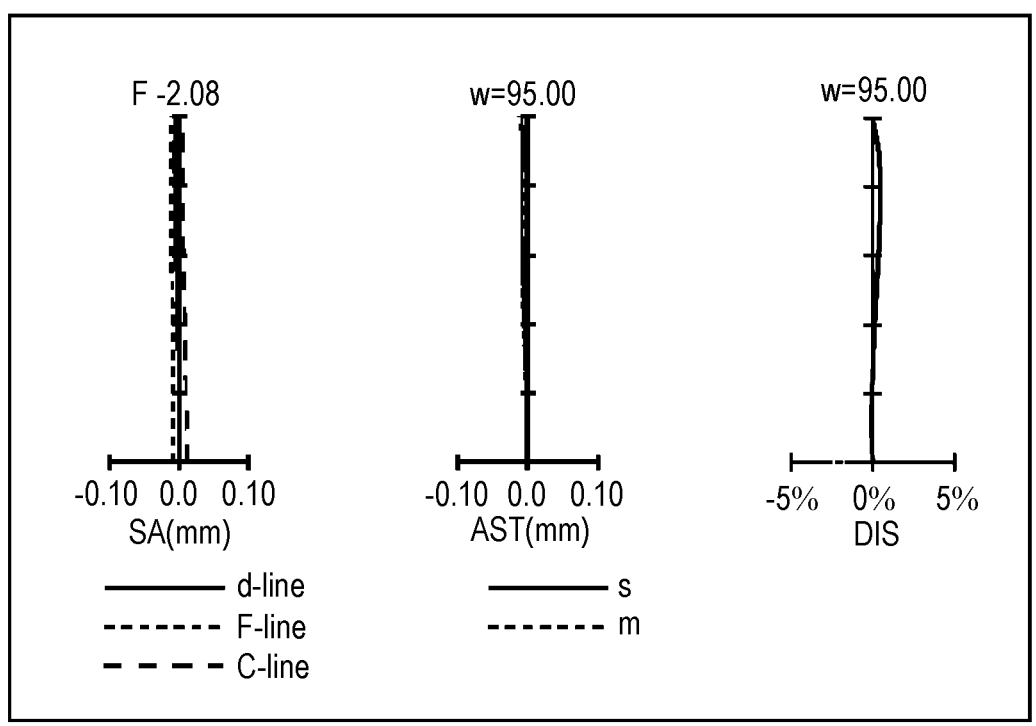
FIG. 30 is a longitudinal aberration diagram of the lens system according to the tenth exemplary embodiment.
Figure 33:
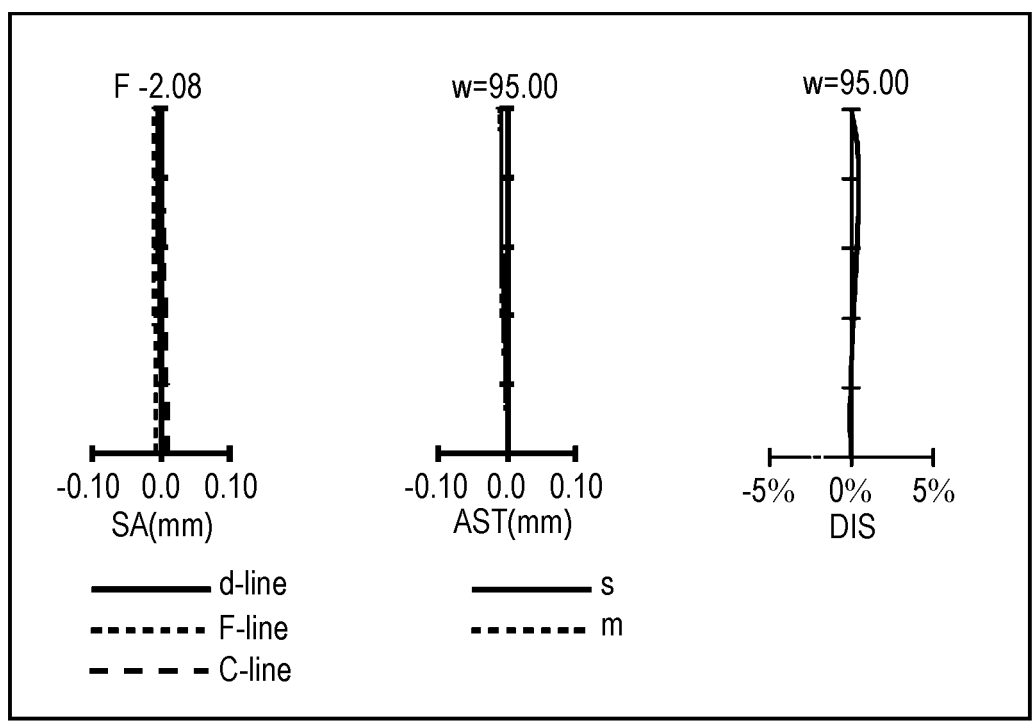
FIG. 33 is a longitudinal aberration diagram of the lens system according to the eleventh exemplary embodiment.

FIGS. 24, 27, 30, and 33 are respectively longitudinal aberration diagrams of a lens system according to the exemplary embodiments eighth through eleventh, in an infinity focusing state.

Each longitudinal aberration diagram shows spherical aberration (SA (mm)), astigmatism (AST (mm)), and distortion aberration (DIS), in order from the left. In a spherical aberration diagram, the vertical axis represents an F number (indicated by F in the diagram); the solid line, the characteristics of d-line; the short-broken line, the characteristics of F-line; and the long-broken line, the characteristics of C-line. In an astigmatism diagram, the vertical axis represents an image height (indicated by H in the diagram); the solid line, the characteristics of a sagittal plane (indicated by s in the diagram); and the broken line, the characteristics of a meridional plane (indicated by m in the diagram). In a distortion aberration diagram, the vertical axis represents an image height (indicated by H in the diagram). Distortion aberration is that in equidistant projection.

A description is made of a case where a lens system according to the following embodiments is used for a projector (an example of an image projection apparatus) that projects image light beams of original image S produced by space-modulating incoming light based on image signals using an image-forming element such as liquid crystal and a digital micro-mirror device (DMD). The lens system of the present disclosure magnify-projects original image S on a liquid crystal display panel for example disposed at the reduction side onto a screen (not shown) disposed on the extended line at the magnification side.

First and Second Exemplary Embodiments

A description is made of the configuration of a lens system according to the first and second exemplary embodiments using FIGS. 1, 2, 4, and 5. The lens system includes magnification optical system Op and relay optical system Ol.

Magnification optical system Op is composed of first lens elements L1 through 11th lens element L11. Magnification optical system Op is composed of front group Opf and rear group Opr. Front group Opf of magnification optical system Op is composed of, in order from the magnification side to the reduction side, first lens element L1 of a negative meniscus shape with its convex surface facing the magnification side, and second lens element L2 of a negative meniscus shape with its convex surface facing the magnification side. Rear group Opr of magnification optical system Op is composed of, in order from the magnification side to the reduction side, third lens element L3 of a positive meniscus shape with its convex surface facing the reduction side, fourth lens element L4 of a positive meniscus shape with its convex surface facing the object side, fifth lens element L5 of a biconcave shape, sixth lens element L6 of a biconvex shape, seventh lens element L7 of a biconvex shape, eighth lens element L8 of a biconcave shape, ninth lens element L9 of a positive meniscus shape with its convex surface facing the reduction side, 10th lens element L10 of a biconvex shape, and 11th lens element L11 of a positive meniscus shape with its convex surface facing the magnification side. Seventh lens element L7 and eighth lens element L8 compose an image surface curvature correction lens group that moves along the optical axis when adjusting the amount of image surface curvature.

Relay optical system Ol is composed of, in order from the magnification side to the reduction side, 12th lens element L12 with positive power, 13th lens element L13 of a biconcave shape, 14th lens element L14 of a positive meniscus shape with its convex surface facing the reduction side, 15th lens element L15 of a biconvex shape, 16th lens element L16 of a biconcave shape, 17th lens element L17 of a negative meniscus shape with its convex surface facing magnification side, 18th lens element L18 of a biconvex shape, 19th lens element L19 of a negative meniscus shape with its convex surface facing the reduction side, 20th lens element L20 of a biconvex shape, 21st lens element L21 of a negative meniscus shape with its convex surface facing the reduction side, and 22nd lens element L22 of a biconvex shape. There is intermediate image-forming position MI between 11th lens element L11 and 12th lens element L12. There is aperture stop A disposed between 16th lens element L16 and 17th lens element L17.

Third and Fourth Exemplary Embodiments

A description is made of the configuration of a lens system according to the third and fourth exemplary embodiments using FIGS. 7, 8, 10, and 11. The lens system includes magnification optical system Op and relay optical system Ol.

Magnification optical system Op is composed of first lens element L1 through 12th lens element L12. Magnification optical system Op is composed of front group Opf and rear group Opr. Front group Opf of magnification optical system Op is composed of, in order from the magnification side to the reduction side, first lens element L1 of a negative meniscus shape with its convex surface facing the magnification side, second lens element L2 of a negative meniscus shape with its convex surface facing the magnification side, and a third lens element of a biconcave shape. Rear group Opr of magnification optical system Op is composed of, in order from the magnification side to the reduction side, fourth lens element L4 of a biconvex shape, fifth lens element L5 of a positive meniscus shape with its convex surface facing the reduction side, sixth lens element L6 of a biconcave shape, seventh lens element L7 of a biconvex shape, eighth lens element L8 of a biconvex shape, ninth lens element L9 of a biconcave shape, 10th lens element L10 of a positive meniscus shape with its convex surface facing the reduction side, 11th lens element L11 of a biconvex shape, and 12th lens element L12 of a positive meniscus shape with its convex surface facing the magnification side. Eighth lens element L8 and ninth lens element L9 compose an image surface curvature correction lens group that moves along the optical axis when adjusting the amount of image surface curvature.

Relay optical system Ol is composed of, in order from the magnification side to the reduction side, 13th lens element L13 of a positive meniscus shape with its convex surface facing the reduction side, 14th lens element L14 of a biconcave shape, 15th lens element L15 of a positive meniscus shape with its convex surface facing the reduction side, 16th lens element L16 of a negative meniscus shape with its convex surface facing the reduction side, 17th lens element L17 of a biconvex shape, 18th lens element L18 of a negative meniscus shape with its convex surface facing the magnification side, 19th lens element L19 of a biconvex shape, 20th lens element L20 of a biconcave shape, 21st lens element L21 of a biconvex shape, 22nd lens element L22 of a negative meniscus shape with its convex surface facing the reduction side, and 23rd lens element L23 of a biconvex shape. There is intermediate image-forming position MI between 12th lens element L12 and 13th lens element L13. There is aperture stop A disposed between 17th lens element L17 and 18th lens element L18.

Fifth, Sixth, and Seventh Exemplary Embodiments

A description is made of the configuration of a lens system according to the fifth, sixth, and seventh exemplary embodiments using FIGS. 13, 14, 16, 17, 19, and 20. The lens system includes magnification optical system Op and relay optical system Ol.

Magnification optical system Op is composed of first lens element L1 through 12th lens element L12. Magnification optical system Op is composed of front group Opf and rear group Opr. Front group Opf of magnification optical system Op is composed of, in order from the magnification side to the reduction side, first lens element L1 of a negative meniscus shape with its convex surface facing the magnification side, second lens element L2 of a negative meniscus shape with its convex surface facing the magnification side, and third lens element of a negative meniscus shape with its convex surface facing the magnification side. Rear group Opr of magnification optical system Op is composed of, in order from the magnification side to the reduction side, fourth lens element L4 of a biconvex shape, fifth lens element L5 of a positive meniscus shape with its convex surface facing the reduction side, sixth lens element L6 of a biconcave shape, seventh lens element L7 of a biconvex shape, eighth lens element L8 of a biconvex shape, ninth lens element L9 of a biconcave shape, 10th lens element L10 of a positive meniscus shape with its convex surface facing the reduction side, 11th lens element L11 of a biconvex shape, and 12th lens element L12 of a positive meniscus shape with its convex surface facing the magnification side. Eighth lens element L8 and ninth lens element L9 compose an image surface curvature correction lens group that moves along the optical axis when adjusting the amount of image surface curvature.

Relay optical system Ol is composed of, in order from the magnification side to the reduction side, 13th lens element L13 of a positive meniscus shape with its convex surface facing the reduction side, 14th lens element L14 of a biconcave shape, 15th lens element L15 of a positive meniscus shape with its convex surface facing the reduction side, 16th lens element L16 of a biconvex shape, 17th lens element L17 of a biconcave shape, 18th lens element L18 of a negative meniscus shape with its convex surface facing the magnification side, 19th lens element L19 of a biconvex shape, 20th lens element L20 of a biconcave shape, 21st lens element L21 of a biconvex shape, 22nd lens element L22 of a negative meniscus shape with its convex surface facing the reduction side, and 23rd lens element L23 of a biconvex shape. There is intermediate image-forming position MI between 12th lens element L12 and 13th lens element L13. There is aperture stop A disposed between 17th lens element L17 and 18th lens element L18.

Eighth and Ninth Exemplary Embodiments

A description is made of the configuration of a lens system according to the eighth and ninth exemplary embodiments using FIGS. 22, 23, 25, and 26. The lens system includes magnification optical system Op and relay optical system Ol.

Magnification optical system Op is composed of first lens element L1 through 10th lens element L10. Magnification optical system Op is composed of front group Opf and rear group Opr. Front group Opf of magnification optical system Op is composed of, in order from the magnification side to the reduction side, first lens element L1 of a negative meniscus shape with its convex surface facing the magnification side, and second lens element L2 of a negative meniscus shape with its convex surface facing the magnification side. Rear group Opr of magnification optical system Op is composed of, in order from the magnification side to the reduction side, third lens element L3 of a positive meniscus shape with its convex surface facing the reduction side, fourth lens element L4 of a negative meniscus shape with its convex surface facing the reduction side, fifth lens element L5 of a positive meniscus shape with its convex surface facing the reduction side, sixth lens element L6 of a positive meniscus shape with its convex surface facing the reduction side, seventh lens element L7 of a positive meniscus shape with its convex surface facing the reduction side, eighth lens element L8 of a negative meniscus shape with its convex surface facing the reduction side, ninth lens element L9 of a biconvex shape, and 10th lens element L10 of a biconvex shape. Third lens element L3 and fourth lens element L4 are joined together and have positive power in total.

Relay optical system Ol is composed of, in order from the magnification side to the reduction side, 11th lens element L11 with negative power, 12th lens element L12 of a negative meniscus shape with its convex surface facing the reduction side, 13th lens element L13 of a biconcave shape, 14th lens element L14 of a positive meniscus shape with its convex surface facing the reduction side, 15th lens element L15 of a biconvex shape, 16th lens element L16 of a positive meniscus shape with its convex surface facing the magnification side, 17th lens element L17 of a biconcave shape, 18th lens element L18 of a positive meniscus shape with its convex surface facing the magnification side, 19th lens element L19 of a biconvex shape, 20th lens element L20 of a negative meniscus shape with its convex surface facing the magnification side, 21st lens element L21 of a biconvex shape, 22nd lens element L22 of a biconcave shape, 23rd lens element L23 of a negative meniscus shape with its convex surface facing the magnification side, 24th lens element L24 of a biconvex shape, and 25th lens element L25 of a positive meniscus shape with its convex surface facing the magnification side. Joining is made between 17th lens element L17 and 18th lens element L18, between 21st lens element L21 and 22nd lens element L22, and between 23rd lens element L23 and 24th lens element L24. There is intermediate image-forming position MI inside 11th lens element L11. There is aperture stop A disposed between 22nd lens element L22 and 23rd lens element L23.

Tenth and Eleventh Exemplary Embodiments

A description is made of the configuration of a lens system according to the tenth and eleventh exemplary embodiments using FIGS. 28, 29, 31, and 32. The lens system includes magnification optical system Op and relay optical system Ol.

Magnification optical system Op is composed of first lens element L1 through eighth lens element L8. Magnification optical system Op is composed of front group Opf and rear group Opr. Front group Opf of magnification optical system Op is composed of, in order from the magnification side to the reduction side, first lens element L1 of a negative meniscus shape with its convex surface facing the magnification side, and second lens element L2 of a negative meniscus shape with its convex surface facing the magnification side. Rear group Opr of magnification optical system Op is composed of, in order from the magnification side to the reduction side, third lens element L3 of a biconvex shape, fourth lens element L4 of a negative meniscus shape with its convex surface facing the reduction side, fifth lens element L5 of a positive meniscus shape with its convex surface facing the reduction side, sixth lens element L6 of a positive meniscus shape with its convex surface facing the reduction side, seventh lens element L7 of a negative meniscus shape with its convex surface facing the reduction side, and eighth lens element L8 of a biconvex shape. Third lens element L3 and fourth lens element L4 are joined together and has positive power in total.

Relay optical system Ol is composed of, in order from the magnification side to the reduction side, ninth lens element L9 of a biconvex shape, 10th lens element L10 of a biconcave shape, 11th lens element L11 of a biconvex shape, 12th lens element L12 of a positive meniscus shape with its convex surface facing the magnification side, 13th lens element L13 of a biconcave shape, 14th lens element L14 of a biconvex shape, 15th lens element L15 of a negative meniscus shape with its concave surface facing the reduction side, 16th lens element L16 of a negative meniscus shape with its convex surface facing the magnification side, 17th lens element L17 of a biconvex shape, and 18th lens element L18 of a positive meniscus shape with its convex surface facing the magnification side. Joining is made between 10th lens element L10 and 11th lens element L11, between 14th lens element L14 and 15th lens element L15, and between 16th lens element L16 and 17th lens element L17. There is intermediate image-forming position MI between eighth lens element L8 and ninth lens element L9. There is aperture stop A disposed between 15th lens element L15 and 16th lens element L16.

A lens system according to the exemplary embodiments first through eleventh forms an image conjugately between each of the magnification conjugate points at the magnification side and at the reduction side; and the intermediate image-forming position inside the lens system. The lens system according to the exemplary embodiments first through eleventh includes a magnification optical system composed of lens elements closer to the magnification side than the intermediate image-forming position; and a relay optical system composed of lens elements closer to the reduction side than the intermediate image-forming position. If the intermediate image-forming position is inside a lens element, the lens group closer to the magnification side than the lens element is a magnification optical system; the lens group closer to the reduction side than the lens element is a relay optical system. Intermediate image forming of an original image by the relay optical system facilitates correcting various aberrations, especially correcting chromatic aberration of magnification for example.

The lens system according to the exemplary embodiments first through eleventh includes magnification optical system Op composed of front group Opf composed of lens elements closer to the magnification side than the lens element with positive power disposed closest to the magnification side of magnification optical system Op; and rear group Opr composed of lens elements closer to the reduction side than the lens element with positive power disposed closest to the magnification side of magnification optical system Op. This structure prevents light beams entering a lens at the magnification side from an excessive oblique light incidence with respect to the entrance surface and the exit surface, reducing the loss of the light amount due to reflection and aberration of image surface curvature.

The lens system according to the exemplary embodiments first through eleventh includes front group Opf that has, in order from the magnification side to the reduction side in magnification optical system Op, first lens element L1 of a negative meniscus shape with its convex surface facing the magnification side; and second lens element L2 of a negative meniscus shape with its convex surface facing the magnification side. This structure, which provides a wide view angle like a fish-eye lens, prevents light beams entering a lens at the magnification side from an excessive oblique light incidence with respect to the entrance surface and the exit surface, reducing the loss of the light amount due to reflection and aberration of image surface curvature The lens system according to the exemplary embodiments first through eleventh includes a rear group that has an image surface curvature correction lens group that moves in the optical axis direction when adjusting the amount of image surface curvature, in magnification optical system Op. This structure allows determining an optimum amount of image surface curvature according to the object distance and the curvature radius of a screen surface for projection.

Hereinafter, a description is made of favorable conditions satisfied by a lens system according to the exemplary embodiments first through eleventh. Here, multiple favorable conditions are defined for a lens system according to each embodiment, and the configuration of a lens system is most favorable that satisfies all the conditions. However, satisfying individual conditions provides a lens system that yields the corresponding advantage.

The lens system according to the exemplary embodiments first through eleventh is a lens system that forms an image conjugately between each of the magnification conjugate points at the magnification side and at the reduction side; and the intermediate image-forming position inside a lens element. The lens system is composed of a magnification optical system with positive power that has multiple lens elements and is positioned closer to the magnification side than the intermediate image-forming position; and a relay optical system with positive power that has multiple lens elements and is positioned closer to the reduction side than the intermediate image-forming position (hereinafter, this lens configuration is referred to as the basic configuration according to an embodiment). The lens system favorably satisfies following conditions (1) and (2).

$$0.08 \leq fp/fr \leq 0.8 \tag{1}$$

$$\{Y\max - ft \cdot \tan(\omega\max)\}/\{ft \cdot \tan(\omega\max)\} \leq -0.3 \tag{2}$$

where fr is the composite focal length of a relay optical system closer to the reduction side than the intermediate image-forming position, fp is the composite focal length of a magnification optical system closer to the magnification side than the intermediate image-forming position, Ymax is the radius of an effective image diameter, ωmax is the maximum half view angle, and ft is the focal length of the lens system as a whole.

Condition (1) defines a relationship between the composite focal lengths of the magnification optical system and the relay optical system. Satisfying this condition provides a lens system with a small lens diameter despite a wide-angle lens system. Exceeding the upper limit of condition (1) causes too large an effective diameter of the lens element closest to the magnification side. Conversely, falling below the lower limit causes too large an effective diameter of a lens element with positive power closer to the magnification side than the intermediate image-forming position and closest to the intermediate image-forming position. As a result, designing a lens system within the range of condition (1) makes smaller the effective diameter (which tends to be larger for a fish-eye lens) of a lens element in magnification optical system Op.

Further satisfying at least one of the following conditions (1A) and (1B) enhances the above-described advantage.

$$0.15 \leq fp/fr \tag{1A}$$

$$fp/fr \leq 0.7 \tag{1B}$$

Furthermore satisfying at least one of the following conditions (1C) and (1D) enhances the above-described advantage.

$$0.18 \leq fp/fr \tag{1C}$$

$$fp/fr \leq 0.6 \tag{1D}$$

Condition (2) expresses distortion aberration with respect to an effective image diameter in a common optical system. Satisfying this condition provides a wide-angle lens system. Exceeding the upper limit of condition (2) makes it difficult to provide a wide-angle lens system.

A lens system with the basic configuration (e.g., a lens system according to the exemplary embodiments first through eleventh) favorably satisfies following condition (3).

$$0.4 \leq fpf/(ft \cdot \omega max \cdot \pi/180) \leq 1.8 \quad (3)$$

where
fpf is the composite focal length of the front group of a magnification optical system.

Condition (3) defines a relationship between the composite focal length of a magnification optical system and the ideal image height in equidistant projection. Satisfying this condition suppresses chromatic aberration of magnification. Exceeding the upper limit of condition (3) increases chromatic aberration of magnification; conversely, falling below the lower limit also increases chromatic aberration of magnification.

Further satisfying at least one of the following conditions (3A) and (3B) enhances the above-described advantage.

$$0.6 \leq fpf/(ft \cdot \omega max \cdot \pi/180) \quad (3A)$$

$$fpf/(ft \cdot \omega max \cdot \pi/180) \leq 1.6 \quad (3B)$$

A lens system with the basic configuration (e.g., a lens system according to the exemplary embodiments first through eleventh) favorably satisfies following condition (4).

$$60 < |(Lt \cdot ft \cdot \omega max \cdot \pi/180)/ft^2| < 200 \quad (4)$$

where
Lt is the total optical length of a lens system.

Condition (4) defines a relationship between a value produced by normalizing the total length of a lens system with the focal length; and a value produced by normalizing the ideal image height in equidistant projection with the focal length. Exceeding the upper limit of condition (4) results in too long total length. Conversely, falling below the lower limit increases chromatic aberration of magnification.

Further satisfying at least one of the following conditions (4A) and (4B) enhances the above-described advantage.

$$70 < |(Lt \cdot ft \cdot \omega max \cdot \pi/180)/ft^2| \quad (4A)$$

$$|(Lt \cdot ft \cdot \omega max \cdot \pi/180)/ft^2| < 160 \quad (4B)$$

A lens system with the basic configuration (e.g., a lens system according to the exemplary embodiments first through eleventh) favorably satisfies following condition (5).

$$|t/ft| \leq 3.0 \quad (5)$$

where
t is the distance on the optical axis between a surface of a lens element closest to the reduction side among the at least one lens element in the front group of the magnification optical system; and a surface of a lens element closest to the magnification side among the at least one lens element in the rear group of the magnification optical system.

Condition (5) defines a relationship between the distance on the optical axis between the lens surface of the front group of the magnification optical system closest to the reduction side and the lens surface of the rear group of the magnification optical system closest to the magnification side; and the focal length of the entire lens system. Satisfying this relationship decreases the effective diameter of the lens element closest to the magnification side. Exceeding the upper limit results in too long an effective diameter of the lens element closest to the magnification side.

Further satisfying condition (5A) enhances the above-described advantage.

$$|t/ft| \leq 2.5 \quad (5A)$$

A lens system with the basic configuration (e.g., a lens system according to the exemplary embodiments first through eleventh) favorably satisfies following condition (6).

$$36 < |(Lr \cdot ft \cdot \omega max \cdot \pi/180)/ft^2| < 150 \quad (6)$$

where
Lr is the distance on the optical axis from the intermediate image-forming position to the image-forming position at the reduction side.

Condition (6) defines a relationship between a value produced by normalizing the distance on the optical axis from the intermediate image-forming position to the image-forming position at the reduction side with the focal length; and a value produced by normalizing the ideal image height in equidistant projection with the focal length. Satisfying this condition suppresses chromatic aberration of magnification with a small total length. Exceeding the upper limit of condition (6) results in too long total length. Conversely, falling below the lower limit increases chromatic aberration of magnification.

Further satisfying at least one of the following conditions (6A) and (6B) enhances the above-described advantage.

$$40 < |(Lr \cdot ft \cdot \omega max \cdot \pi/180)/ft^2| \quad (6A)$$

$$|(Lr \cdot ft \cdot \omega max \cdot \pi/180)/ft^2| < 120 \quad (6B)$$

A lens system with the basic configuration (e.g., a lens system according to the exemplary embodiments first through eleventh) favorably satisfies following condition (7).

$$2.9 < SFL1 < 5.0 \quad (7)$$

where
SFL1 is the shape factor of the lens element closest to the magnification side in the lens system.

Condition (7) defines the shape factor of the lens element closest to the magnification side in the lens system. Exceeding the upper limit of condition (7) results in too large an effective diameter of the lens element closest to the magnification side. Conversely, falling below the lower limit results in a shape of the lens element closest to the magnification side difficult to produce.

Further satisfying at least one of the following conditions (7A) and (7B) enhances the above-described advantage.

$$3.0 < SFL1 \quad (7A)$$

$$SFL1 < 4.5 \quad (7B)$$

A lens system with the basic configuration (e.g., a lens system according to the exemplary embodiments first through seventh) that has an image surface curvature correction group that moves along the optical axis when adjusting the amount of image surface curvature, in the rear group of the magnification optical system favorably satisfies following condition (8).

$$10 < |fas/(ft \cdot \omega \cdot \pi/180)| < 1000 \quad (8)$$

where fas is the composite focal length of an image surface curvature correction group.

Condition (8) defines a relationship between the composite focal length of an image surface curvature correction group and the ideal image height in equidistant projection. Satisfying this condition allows the amount of image surface curvature to be corrected while suppressing changes in back focus despite its small size. Exceeding the upper limit of condition (8) results in too large a moving amount of the image surface curvature correction group for correcting image surface curvature, which extends the total length. Conversely, falling below the lower limit changes back focus due to movement of the image surface curvature correction group, which requires adjusting the back focus, resulting in troublesome correction of image surface curvature.

Further satisfying at least one of the following conditions (8A) and (8B) enhances the above-described advantage.

$$30<|fas/(ft\cdot\omega\cdot\pi/180)| \tag{8A}$$

$$|fas/(ft\cdot\omega\cdot\pi/180)|<700 \tag{8B}$$

A lens system with the basic configuration (e.g., a lens system according to the exemplary embodiments first through eleventh) favorably satisfies following condition (9).

$$2<|f1/(f\cdot\omega\cdot\pi/180)|<10 \tag{9}$$

where f1 is the focal length of the lens element closest to the magnification side in the lens system.

Condition (9) defines a relationship between the focal length of the lens element closest to the magnification side in the lens system; and the ideal image height in equidistant projection. Satisfying this condition prevents the size of the lens element closest to the magnification side from being larger despite its wide view angle. Exceeding the upper limit of condition (9) results in too large an effective diameter of the lens element closest to the magnification side. Conversely, falling below the lower limit results in too weak power of the lens element closest to the magnification side, causing the lens shape to be difficult to produce.

Further satisfying at least one of the following conditions (9A) and (9B) enhances the above-described advantage.

$$3<|f1/(f\cdot\omega\cdot\pi/180)| \tag{9A}$$

$$|f1/(f\cdot\omega\cdot\pi/180)|<8 \tag{9B}$$

A lens system with the basic configuration (e.g., a lens system according to the exemplary embodiments first through eleventh) favorably satisfies following condition (10).

$$0.8<\varphi p f \max/\varphi p r \max<1.3 \tag{10}$$

where

φpfmax is the maximum lens effective diameter of a lens element in the front group of the magnification optical system φprmax is the maximum lens effective diameter of a lens element in the rear group of the magnification optical system Condition (10) defines the ratio of the maximum lens effective diameter of a lens element in the front group of the magnification optical system; to the maximum lens effective diameter of a lens element in the rear group of the magnification optical system. Exceeding the upper limit results in too large an effective diameter of the lens element closest to the magnification side. Conversely, falling below the lower limit results in too large an effective diameter of a lens element closer to the magnification side than the intermediate image-forming position and close to the intermediate image-forming position.

Further satisfying at least one of the following conditions (10A) and (10B) enhances the above-described advantage.

$$0.9<\varphi p f \max/\varphi p r \max \tag{10A}$$

$$\varphi p f \max/\varphi p r \max<1.2 \tag{10B}$$

Hereinbefore, the embodiments are described to exemplify the technology disclosed in this application. The technology of the disclosure, however, is not limited to these embodiments, but is applicable to other embodiments appropriately devised through modification, substitution, addition, and omission for example.

Hereinafter, a description is made of some numerical practical examples of a lens system according to the first through eleventh exemplary embodiments. The practical examples represent each length in tables in the unit of mm; each view angle in the unit of ° (degree). In the practical examples, r is a curvature radius; d, a surface distance; nd, a refractive index for d-line; and vd, an Abbe number for d-line.

Numerical Practical Example 1

Hereinafter, the lens system of numerical practical example 1 (corresponding to the first exemplary embodiment) is described. Table 1 shows surface data; table 2 shows various types of data; and table 3 shows single lens data.

TABLE 1

| Surface No. | r | d | nd | vd | Effective radius |
|---|---|---|---|---|---|
| Object surface | variable | variable | | | |
| 1 | 62.69070 | 3.50000 | 1.90366 | 31.3 | 40.002 |
| 2 | 34.32240 | 13.02190 | | | 29.207 |
| 3 | 105.47160 | 2.50000 | 1.83481 | 42.7 | 27.953 |
| 4 | 23.23070 | 17.98760 | | | 19.626 |
| 5 | −195.28960 | 15.00000 | 1.48749 | 70.4 | 16.426 |
| 6 | −65.95860 | 14.09830 | | | 12.410 |
| 7 | −136.20600 | 15.00000 | 1.72916 | 54.7 | 6.552 |
| 8 | −17.52700 | 0.58380 | | | 10.519 |
| 9 | −17.38980 | 2.00000 | 1.80809 | 22.8 | 10.559 |
| 10 | 156.95630 | 1.50420 | | | 12.839 |
| 11 | 157.84770 | 6.47740 | 1.59349 | 67.0 | 14.654 |
| 12 | −34.35610 | variable | | | 15.598 |
| 13 | 138.60270 | 15.00000 | 1.48749 | 70.4 | 20.409 |
| 14 | −57.74380 | 28.99170 | | | 22.365 |
| 15 | −37.28120 | 5.00000 | 1.54072 | 47.2 | 25.302 |
| 16 | 222.07570 | variable | | | 31.730 |
| 17 | −221.82780 | 11.86280 | 1.80809 | 22.8 | 33.625 |
| 18 | −54.27070 | 0.20000 | | | 34.564 |
| 19 | 129.22220 | 10.04050 | 1.80518 | 25.5 | 38.830 |
| 20 | −364.44020 | 0.20000 | | | 38.788 |
| 21 | 50.76810 | 13.57320 | 1.80518 | 25.5 | 36.546 |
| 22 | 83.01170 | 37.73970 | | | 33.985 |
| 23 | 550.39610 | 15.00000 | 1.48749 | 70.4 | 20.771 |
| 24 | −45.21240 | 1.73260 | | | 18.284 |
| 25 | −39.01460 | 3.31630 | 1.83400 | 37.3 | 16.822 |
| 26 | 53.30150 | 71.75870 | | | 16.140 |
| 27 | −1075.96590 | 7.91760 | 1.80420 | 46.5 | 25.673 |
| 28 | −74.09750 | 0.20000 | | | 25.979 |
| 29 | 148.27110 | 5.19390 | 1.80809 | 22.8 | 24.942 |
| 30 | −279.86580 | 4.69580 | | | 24.626 |
| 31 | −118.64140 | 2.00000 | 1.59349 | 67.0 | 23.297 |
| 32 | 375.45370 | 54.28750 | | | 22.672 |
| 33 (aperture) | ∞ | 45.61360 | | | 17.948 |
| 34 | 161.63410 | 2.00000 | 1.80518 | 25.5 | 18.931 |

TABLE 1-continued

| Surface No. | r | d | nd | vd | Effective radius |
|---|---|---|---|---|---|
| 35 | 68.06500 | 7.66990 | | | 19.077 |
| 36 | 268.94410 | 8.15390 | 1.55032 | 75.5 | 20.912 |
| 37 | −44.80050 | 0.97200 | | | 21.248 |
| 38 | −44.99690 | 2.13870 | 1.80518 | 25.5 | 21.222 |
| 39 | −277.85820 | 1.63120 | | | 22.640 |
| 40 | 109.06800 | 10.88750 | 1.55032 | 75.5 | 24.413 |
| 41 | −52.45940 | 0.81880 | | | 24.644 |
| 42 | −51.07450 | 2.50000 | 1.80518 | 25.5 | 24.570 |
| 43 | −85.99100 | 4.31550 | | | 25.459 |
| 44 | 152.01240 | 5.69150 | 1.72916 | 54.7 | 26.275 |
| 45 | −243.69600 | 10.00000 | | | 26.217 |
| 46 | ∞ | 95.00000 | 1.51680 | 64.2 | 24.717 |
| 47 | ∞ | BF | | | 16.527 |
| Image surface | ∞ | | | | |

TABLE 2

| | | | |
|---|---|---|---|
| Object distance | 4000.0000 | 2000.0000 | 7000.0000 |
| Object curvature radius | 4050.0000 | 2025.0000 | 7100.0000 |
| Focal length | −9.7000 | −9.7001 | −9.7000 |
| F number | −2.50010 | −2.50015 | −2.50007 |
| Half view angle | 90.1000 | 90.1000 | 90.1000 |
| Effective image radius | −15.3152 | −15.3153 | −15.3151 |
| Total lens length | 600.0334 | 600.0564 | 600.0233 |
| BF | 9.23349 | 9.25653 | 9.22351 |
| d12 | 5.8933 | 5.8883 | 5.8950 |
| d16 | 7.1305 | 7.1355 | 7.1287 |
| Entrance pupil position | 27.2905 | 27.2910 | 27.2903 |
| Exit pupil position | −994.6640 | −994.6640 | −994.6640 |
| Front principal point | 17.4967 | 17.4971 | 17.4965 |
| Rear principal point | 609.7101 | 609.7101 | 609.7099 |

TABLE 3

| Lens elements | First surface | Focal length |
|---|---|---|
| L1 | 1 | −89.1566 |
| L2 | 3 | −36.1887 |
| L3 | 5 | 196.8253 |
| L4 | 7 | 26.1912 |
| L5 | 9 | −19.2744 |
| L6 | 11 | 48.1449 |
| L7 | 13 | 85.7631 |
| L8 | 15 | −58.6398 |
| L9 | 17 | 86.1847 |
| L10 | 19 | 119.5632 |
| L11 | 21 | 136.6668 |
| L12 | 23 | 86.4184 |
| L13 | 25 | −26.5757 |
| L14 | 27 | 98.6055 |
| L15 | 29 | 120.5940 |
| L16 | 31 | −151.6744 |
| L17 | 34 | −147.4318 |
| L18 | 36 | 70.4330 |
| L19 | 38 | −66.9573 |
| L20 | 40 | 65.9438 |
| L21 | 42 | −161.3723 |
| L22 | 44 | 129.1729 |

Numerical Practical Example 2

Hereinafter, the lens system of numerical practical example 2 (corresponding to the second exemplary embodiment) is described. Table 4 shows surface data; table 5 shows various types of data; and table 6 shows single lens data.

TABLE 4

| Surface No. | r | d | nd | vd | Effective radius |
|---|---|---|---|---|---|
| Object surface | variable | variable | | | |
| 1 | 63.05300 | 3.50000 | 1.84670 | 23.8 | 40.004 |
| 2 | 33.98800 | 13.23470 | | | 28.945 |
| 3 | 112.90930 | 2.50000 | 1.80420 | 46.5 | 27.641 |
| 4 | 22.78180 | 18.40380 | | | 19.229 |
| 5 | −240.95330 | 15.00000 | 1.56865 | 42.3 | 15.506 |
| 6 | −68.72420 | 12.77320 | | | 11.550 |
| 7 | −109.63800 | 15.00000 | 1.71625 | 55.2 | 6.979 |
| 8 | −17.31030 | 0.64950 | | | 11.009 |
| 9 | −16.98500 | 2.00000 | 1.84094 | 23.9 | 11.044 |
| 10 | 380.43980 | 1.22140 | | | 13.625 |
| 11 | 208.60810 | 7.19930 | 1.59107 | 61.9 | 15.407 |
| 12 | −31.75680 | variable | | | 16.412 |
| 13 | 157.68700 | 8.63680 | 1.48809 | 70.3 | 19.723 |
| 14 | −51.42000 | 30.20750 | | | 20.428 |
| 15 | −32.96310 | 5.00000 | 1.59774 | 38.0 | 23.513 |
| 16 | 356.37720 | variable | | | 30.254 |
| 17 | −185.30010 | 11.91540 | 1.84670 | 23.8 | 32.321 |
| 18 | −49.96620 | 0.20000 | | | 33.344 |
| 19 | 150.60280 | 9.25680 | 1.84670 | 23.8 | 37.667 |
| 20 | −288.97820 | 0.20000 | | | 37.678 |
| 21 | 51.76330 | 15.00000 | 1.84670 | 23.8 | 35.930 |
| 22 | 82.29800 | 38.13980 | | | 32.639 |
| 23 | −336.94820 | 15.00000 | 1.62948 | 59.7 | 20.792 |
| 24 | −46.10850 | 1.74690 | | | 19.062 |
| 25 | −40.04800 | 6.12440 | 1.79934 | 40.0 | 17.692 |
| 26 | 55.01210 | 71.80140 | | | 16.832 |
| 27 | −1336.58980 | 7.81710 | 1.80420 | 46.5 | 26.494 |
| 28 | −74.79370 | 0.20000 | | | 26.763 |
| 29 | 159.00380 | 5.23580 | 1.81155 | 24.7 | 25.626 |
| 30 | −275.37430 | 3.16720 | | | 25.307 |
| 31 | −121.29070 | 2.00000 | 1.59229 | 56.6 | 24.595 |
| 32 | 334.61080 | 61.25040 | | | 23.805 |
| 33(aperture) | ∞ | 51.65310 | | | 18.057 |
| 34 | 158.42700 | 2.00000 | 1.80033 | 28.2 | 20.053 |
| 35 | 69.49600 | 6.45570 | | | 20.155 |
| 36 | 207.48670 | 8.56850 | 1.55032 | 75.5 | 21.638 |
| 37 | −47.06510 | 0.92530 | | | 21.960 |
| 38 | −47.61470 | 2.00000 | 1.80376 | 27.0 | 21.925 |
| 39 | −431.07330 | 0.20000 | | | 23.308 |
| 40 | 106.20010 | 11.09520 | 1.55032 | 75.5 | 24.559 |
| 41 | −52.54660 | 0.73100 | | | 24.791 |
| 42 | −51.28940 | 2.50000 | 1.80414 | 27.7 | 24.723 |
| 43 | −94.42380 | 0.79170 | | | 25.667 |
| 44 | 139.57700 | 6.03150 | 1.73004 | 54.5 | 26.330 |
| 45 | −227.19720 | 0.30090 | | | 26.278 |
| 46 | ∞ | 10.00000 | | | 26.038 |
| 47 | ∞ | 95.00000 | 1.51680 | 64.2 | 24.720 |
| 48 | ∞ | BF | | | 16.504 |
| Image surface | ∞ | | | | |

TABLE 5

| | | | |
|---|---|---|---|
| Object distance | 4000.0000 | 2000.0000 | 7000.0000 |
| Object curvature radius | 4050.0000 | 2025.0000 | 7100.0000 |
| Focal length | −9.7000 | −9.7000 | −9.7000 |
| F number | −2.50008 | −2.50014 | −2.50006 |
| Half view angle | 90.1000 | 90.1000 | 90.1000 |
| Effective image radius | −15.3148 | −15.3149 | −15.3148 |
| Total lens length | 600.0331 | 600.0561 | 600.0230 |
| BF | 9.03286 | 9.05591 | 9.02289 |
| d12 | 2.0038 | 2.0000 | 2.0052 |
| d16 | 6.3621 | 6.3659 | 6.3606 |
| Entrance pupil position | 27.2745 | 27.2750 | 27.2743 |
| Exit pupil position | −969.1441 | −969.1441 | −969.1441 |
| Front principal point | 17.4783 | 17.4788 | 17.4781 |
| Rear principal point | 609.7097 | 609.7097 | 609.7096 |

TABLE 6

| Lens elements | First surface | Focal length |
|---|---|---|
| L1 | 1 | −92.1716 |
| L2 | 3 | −35.9335 |
| L3 | 5 | 163.9044 |
| L4 | 7 | 26.8768 |
| L5 | 9 | −19.2901 |
| L6 | 11 | 47.1542 |
| L7 | 13 | 80.5356 |
| L8 | 15 | −50.2360 |
| L9 | 17 | 77.6656 |
| L10 | 19 | 118.0710 |
| L11 | 21 | 134.4837 |
| L12 | 23 | 83.2040 |
| L13 | 25 | −28.1874 |
| L14 | 27 | 98.2454 |
| L15 | 29 | 124.8820 |
| L16 | 31 | −150.0552 |
| L17 | 34 | −156.2543 |
| L18 | 36 | 70.5531 |
| L19 | 38 | −66.7513 |
| L20 | 40 | 65.5025 |
| L21 | 42 | −143.3245 |
| L22 | 44 | 119.2602 |

Numerical Practical Example 3

Hereinafter, the lens system of numerical practical example 3 (corresponding to the third exemplary embodiment) is described. Table 7 shows surface data; table 8 shows various types of data; and table 9 shows single lens data.

TABLE 7

| Surface No. | r | d | nd | vd | Effective radius |
|---|---|---|---|---|---|
| Object surface | variable | variable | | | |
| 1 | 57.48690 | 3.50000 | 1.90366 | 31.3 | 34.974 |
| 2 | 32.84120 | 8.24230 | | | 26.123 |
| 3 | 60.63820 | 2.50000 | 1.83481 | 42.7 | 24.572 |
| 4 | 20.51880 | 10.64190 | | | 17.222 |
| 5 | −361.54150 | 2.00000 | 1.51823 | 59.0 | 16.468 |
| 6 | 20.23130 | 3.10960 | | | 13.241 |
| 7 | 23.98260 | 10.83900 | 1.48749 | 70.4 | 12.765 |
| 8 | −67.26990 | 7.67080 | | | 10.411 |
| 9 | −64.81820 | 15.00000 | 1.72916 | 54.6 | 4.358 |
| 10 | −14.77170 | 0.20000 | | | 8.989 |
| 11 | −15.23630 | 2.00000 | 1.80809 | 22.8 | 9.050 |
| 12 | 151.89840 | 2.31360 | | | 11.401 |
| 13 | 305.73490 | 7.33380 | 1.59349 | 67.0 | 14.375 |
| 14 | −26.75150 | variable | | | 15.494 |
| 15 | 80.10290 | 13.67660 | 1.48749 | 70.4 | 19.803 |
| 16 | −50.46080 | 14.30490 | | | 21.042 |
| 17 | −35.93420 | 3.00000 | 1.64769 | 33.8 | 21.759 |
| 18 | 152.43020 | variable | | | 25.727 |
| 19 | −195.03790 | 10.41230 | 1.80809 | 22.8 | 27.602 |
| 20 | −44.41460 | 0.20000 | | | 28.527 |
| 21 | 182.27070 | 8.34010 | 1.80518 | 25.5 | 31.284 |
| 22 | −137.09590 | 0.20000 | | | 31.351 |
| 23 | 51.87420 | 9.55090 | 1.80809 | 22.8 | 29.613 |
| 24 | 113.67020 | 31.18070 | | | 28.210 |
| 25 | −150.16630 | 6.22180 | 1.48749 | 70.4 | 18.154 |
| 26 | −40.92490 | 0.72590 | | | 17.767 |
| 27 | −43.41970 | 2.00000 | 1.72825 | 28.3 | 17.112 |
| 28 | 44.65630 | 72.07330 | | | 16.607 |
| 29 | −1070.17200 | 8.80620 | 1.72916 | 54.6 | 30.478 |
| 30 | −79.87360 | 87.67920 | | | 30.867 |
| 31 | 165.95180 | 2.00000 | 1.59349 | 67.0 | 23.064 |
| 32 | 80.33410 | 13.69910 | | | 22.685 |
| 33 | 124.92850 | 4.73250 | 1.84666 | 23.8 | 24.040 |
| 34 | −704.27020 | 45.69470 | | | 24.006 |
| 35(aperture) | ∞ | 5.02880 | | | 21.333 |
| 36 | 128.17330 | 2.00000 | 1.80610 | 33.3 | 21.054 |
| 37 | 63.76750 | 5.05630 | | | 20.962 |

TABLE 7-continued

| Surface No. | r | d | nd | vd | Effective radius |
|---|---|---|---|---|---|
| 38 | 96.26710 | 8.49050 | 1.55032 | 75.5 | 21.999 |
| 39 | −64.14960 | 0.21850 | | | 22.143 |
| 40 | −80.05730 | 2.00000 | 1.80518 | 25.5 | 22.046 |
| 41 | 90.73560 | 0.66590 | | | 22.666 |
| 42 | 97.75860 | 9.75670 | 1.55032 | 75.5 | 22.861 |
| 43 | −55.60920 | 2.01760 | | | 23.146 |
| 44 | −54.92950 | 2.50000 | 1.80518 | 25.5 | 23.094 |
| 45 | −101.92360 | 2.82240 | | | 23.980 |
| 46 | 83.96990 | 6.83750 | 1.72916 | 54.6 | 25.365 |
| 47 | −468.91130 | 10.00000 | | | 25.248 |
| 48 | ∞ | 95.00000 | 1.51680 | 64.2 | 23.842 |
| 49 | ∞ | BF | | | 15.638 |
| Image surface | ∞ | | | | |

TABLE 8

| | | | |
|---|---|---|---|
| Object distance | 4000.0000 | 2000.0000 | 7000.0000 |
| Object curvature radius | 4200.0000 | 2100.0000 | 7350.0000 |
| Focal length | −9.0000 | −9.0000 | −9.0000 |
| F number | −2.50006 | −2.50013 | −2.50004 |
| Half view angle | 91.6000 | 91.6000 | 91.6000 |
| Effective image radius | −14.4060 | −14.4055 | −14.4062 |
| Total lens length | 640.0321 | 640.0521 | 640.0235 |
| BF | 9.35277 | 9.37268 | 9.34417 |
| d14 | 1.9971 | 2.0000 | 1.9959 |
| d18 | 6.4388 | 6.4360 | 6.4400 |
| Entrance pupil position | 23.2580 | 23.2578 | 23.2581 |
| Exit pupil position | −1109.2175 | −1109.2175 | −1109.2175 |
| Front principal point | 14.1856 | 14.1853 | 14.1857 |
| Rear principal point | 649.0120 | 649.0121 | 649.0119 |

TABLE 9

| Lens elements | First surface | Focal length |
|---|---|---|
| L1 | 1 | −90.8977 |
| L2 | 3 | −38.2339 |
| L3 | 5 | −36.9044 |
| L4 | 7 | 37.7356 |
| L5 | 9 | 23.2939 |
| L6 | 11 | −17.0447 |
| L7 | 13 | 41.7913 |
| L8 | 15 | 65.7636 |
| L9 | 17 | −44.6172 |
| L10 | 19 | 69.0365 |
| L11 | 21 | 98.3211 |
| L12 | 23 | 110.4511 |
| L13 | 25 | 113.2859 |
| L14 | 27 | −29.9430 |
| L15 | 29 | 117.9349 |
| L16 | 31 | −264.6658 |
| L17 | 33 | 125.6519 |
| L18 | 36 | −159.6410 |
| L19 | 38 | 71.2922 |
| L20 | 40 | −52.5476 |
| L21 | 42 | 65.8976 |
| L22 | 44 | −151.5559 |
| L23 | 46 | 98.1817 |

Numerical Practical Example 4

Hereinafter, the lens system of numerical practical example 4 (corresponding to the fourth exemplary embodiment) is described. Table 10 shows surface data; table 11 shows various types of data; and table 12 shows single lens data.

TABLE 10

| Surface No. | r | d | nd | vd | Effective radius |
|---|---|---|---|---|---|
| Object surface | variable | variable | | | |
| 1 | 63.65070 | 3.50000 | 1.80420 | 46.5 | 35.029 |
| 2 | 32.00630 | 7.65990 | | | 25.238 |
| 3 | 58.11770 | 2.50000 | 1.80420 | 46.5 | 23.933 |
| 4 | 20.04300 | 9.97980 | | | 16.845 |
| 5 | −16711.84430 | 2.00000 | 1.52499 | 66.7 | 16.198 |
| 6 | 18.55660 | 3.00710 | | | 12.904 |
| 7 | 21.26180 | 11.49640 | 1.49199 | 69.9 | 12.470 |
| 8 | −75.53920 | 7.56460 | | | 9.853 |
| 9 | −72.56330 | 15.00000 | 1.72766 | 54.7 | 4.677 |
| 10 | −14.09960 | 0.58920 | | | 9.524 |
| 11 | −14.05150 | 2.00000 | 1.82460 | 24.4 | 9.597 |
| 12 | 283.21550 | 1.53830 | | | 12.430 |
| 13 | 311.87890 | 7.69690 | 1.59427 | 61.8 | 14.756 |
| 14 | −26.56900 | variable | | | 15.914 |
| 15 | 75.49490 | 9.71000 | 1.48700 | 70.4 | 20.649 |
| 16 | −52.28810 | 17.48840 | | | 21.080 |
| 17 | −34.42240 | 3.00000 | 1.66488 | 31.5 | 21.907 |
| 18 | 155.62230 | variable | | | 26.366 |
| 19 | −233.64550 | 10.27600 | 1.84670 | 23.8 | 28.457 |
| 20 | −48.55530 | 0.20000 | | | 29.445 |
| 21 | 204.32090 | 8.94120 | 1.84670 | 23.8 | 32.904 |
| 22 | −129.79800 | 0.20000 | | | 33.031 |
| 23 | 52.80370 | 10.08930 | 1.84670 | 23.8 | 31.449 |
| 24 | 118.30830 | 31.43120 | | | 30.097 |
| 25 | −129.17710 | 6.72370 | 1.48923 | 68.9 | 19.689 |
| 26 | −43.57940 | 0.96370 | | | 19.213 |
| 27 | −46.55830 | 2.00000 | 1.74151 | 27.2 | 18.285 |
| 28 | 46.71980 | 71.99550 | | | 17.680 |
| 29 | −1609.70270 | 8.64150 | 1.72562 | 54.8 | 31.275 |
| 30 | −82.32630 | 97.95830 | | | 31.598 |
| 31 | 159.18330 | 2.00000 | 1.59089 | 42.6 | 22.224 |
| 32 | 78.55920 | 12.86530 | | | 21.841 |
| 33 | 123.08050 | 4.53930 | 1.84670 | 23.8 | 23.063 |
| 34 | −738.23220 | 39.88540 | | | 23.031 |
| 35(aperture) | ∞ | 62.54520 | | | 20.780 |
| 36 | 113.81370 | 2.00000 | 1.80499 | 32.0 | 20.668 |
| 37 | 59.82940 | 7.70280 | | | 20.559 |
| 38 | 104.60560 | 8.59980 | 1.55032 | 75.5 | 22.252 |
| 39 | −61.85230 | 0.20000 | | | 22.418 |
| 40 | −84.86380 | 2.00000 | 1.80397 | 28.3 | 22.296 |
| 41 | 87.69500 | 0.50270 | | | 22.889 |
| 42 | 87.85240 | 9.86190 | 1.55032 | 75.5 | 23.110 |
| 43 | −59.67840 | 0.91180 | | | 23.374 |
| 44 | −55.27030 | 2.50000 | 1.80262 | 28.6 | 23.361 |
| 45 | −114.36820 | 0.20000 | | | 24.315 |
| 46 | 88.87840 | 6.93430 | 1.73116 | 54.4 | 25.393 |
| 47 | −261.40750 | 10.00000 | | | 25.325 |
| 48 | ∞ | 95.00000 | 1.51680 | 64.2 | 23.847 |
| 49 | ∞ | BF | | | 15.643 |
| Image surface | ∞ | | | | |

TABLE 11

| Object distance | 4000.0000 | 2000.0000 | 7000.0000 |
|---|---|---|---|
| Object curvature radius | 4200.0000 | 2100.0000 | 7350.0000 |
| Focal length | −9.0000 | −9.0000 | −9.0000 |
| F number | −2.50002 | −2.50008 | −2.49999 |
| Half view angle | 91.6000 | 91.6000 | 91.6000 |
| Effective image radius | −14.4061 | −14.4057 | −14.4063 |
| Total lens length | 640.0312 | 640.0512 | 640.0225 |
| BF | 9.39214 | 9.41206 | 9.38354 |
| d0 | 4000.0000 | 2000.0000 | 7000.0000 |
| d14 | 1.9947 | 2.0000 | 1.9927 |
| d18 | 6.2449 | 6.2396 | 6.2468 |
| Entrance pupil position | 22.2397 | 22.2391 | 22.2399 |
| Exit pupil position | −1075.9930 | −1075.9930 | −1075.9930 |
| Front principal point | 13.1651 | 13.1644 | 13.1653 |
| Rear principal point | 649.0111 | 649.0111 | 649.0110 |

TABLE 12

| Lens elements | First surface | Focal length |
|---|---|---|
| L1 | 1 | −84.2043 |
| L2 | 3 | −39.1896 |
| L3 | 5 | −35.3063 |
| L4 | 7 | 35.0983 |
| L5 | 9 | 21.7042 |
| L6 | 11 | −16.1856 |
| L7 | 13 | 41.5513 |
| L8 | 15 | 65.0524 |
| L9 | 17 | −42.1296 |
| L10 | 19 | 70.5935 |
| L11 | 21 | 94.9099 |
| L12 | 23 | 105.2067 |
| L13 | 25 | 131.0475 |
| L14 | 27 | −31.1640 |
| L15 | 29 | 119.2879 |
| L16 | 31 | −264.9395 |
| L17 | 33 | 124.8943 |
| L18 | 36 | −159.3255 |
| L19 | 38 | 71.9494 |
| L20 | 40 | −53.3680 |
| L21 | 42 | 66.1454 |
| L22 | 44 | −135.8223 |
| L23 | 46 | 91.4804 |

Numerical Practical Example 5

Hereinafter, the lens system of numerical practical example 5 (corresponding to the fifth exemplary embodiment) is described. Table 13 shows surface data; table 14 shows various types of data; and table 15 shows single lens data.

TABLE 13

| Surface No. | r | d | nd | vd | Effective radius |
|---|---|---|---|---|---|
| Object surface | variable | variable | | | |
| 1 | 59.70620 | 3.50000 | 1.90366 | 31.3 | 40.016 |
| 2 | 33.73780 | 9.60340 | | | 28.804 |
| 3 | 52.29470 | 2.50000 | 1.83481 | 42.7 | 26.254 |
| 4 | 21.88760 | 10.22000 | | | 18.475 |
| 5 | 243.49310 | 2.00000 | 1.62041 | 60.3 | 17.584 |
| 6 | 18.99430 | 4.47090 | | | 13.405 |
| 7 | 24.66120 | 11.38760 | 1.48749 | 70.4 | 12.456 |
| 8 | −66.77390 | 3.86960 | | | 9.010 |
| 9 | −55.20960 | 15.00000 | 1.72916 | 54.6 | 4.606 |
| 10 | −14.42010 | 0.20000 | | | 8.916 |
| 11 | −14.90290 | 2.00000 | 1.80809 | 22.8 | 8.993 |
| 12 | 164.22930 | 2.43270 | | | 11.605 |
| 13 | −510.00380 | 7.87620 | 1.59349 | 67.0 | 14.703 |
| 14 | −24.31730 | variable | | | 16.062 |
| 15 | 65.37140 | 13.61340 | 1.48749 | 70.4 | 25.486 |
| 16 | −56.39120 | 12.87490 | | | 25.837 |
| 17 | −44.66120 | 3.00000 | 1.64769 | 33.8 | 25.788 |
| 18 | 99.36680 | variable | | | 29.911 |
| 19 | −856.79070 | 12.17840 | 1.80809 | 22.8 | 31.976 |
| 20 | −55.46720 | 0.20000 | | | 32.852 |
| 21 | 343.69180 | 9.39370 | 1.80518 | 25.5 | 35.816 |
| 22 | −119.89620 | 0.20000 | | | 35.969 |
| 23 | 52.98050 | 14.48540 | 1.80809 | 22.8 | 33.882 |
| 24 | 87.93510 | 35.63020 | | | 30.716 |
| 25 | −395.07870 | 7.20750 | 1.48749 | 70.4 | 20.856 |
| 26 | −43.93870 | 1.51360 | | | 20.450 |
| 27 | −42.79770 | 2.00000 | 1.72825 | 28.3 | 19.047 |
| 28 | 46.85640 | 72.47530 | | | 18.378 |
| 29 | −771.11340 | 8.62810 | 1.72916 | 54.6 | 32.639 |
| 30 | −77.66150 | 95.57660 | | | 32.915 |
| 31 | 161.15510 | 4.91720 | 1.84666 | 23.8 | 23.545 |
| 32 | −240.61170 | 1.26980 | | | 23.423 |
| 33 | −143.95050 | 2.00000 | 1.59349 | 67.0 | 23.326 |
| 34 | 1171.86340 | 41.60890 | | | 23.098 |
| 35(aperture) | ∞ | 60.29990 | | | 19.950 |
| 36 | 165.08680 | 2.00000 | 1.80610 | 33.3 | 20.756 |

TABLE 13-continued

| Surface No. | r | d | nd | vd | Effective radius |
|---|---|---|---|---|---|
| 37 | 66.64960 | 4.12230 | | | 20.785 |
| 38 | 150.84310 | 8.81970 | 1.55032 | 75.5 | 21.499 |
| 39 | −47.51940 | 0.71290 | | | 21.771 |
| 40 | −49.82070 | 2.00000 | 1.80518 | 25.5 | 21.700 |
| 41 | 239.62850 | 0.20000 | | | 23.105 |
| 42 | 118.64560 | 10.89680 | 1.55032 | 75.5 | 23.737 |
| 43 | −47.89690 | 0.79870 | | | 24.088 |
| 44 | −46.01480 | 2.50000 | 1.80518 | 25.5 | 24.069 |
| 45 | −68.90210 | 0.20000 | | | 25.167 |
| 46 | 84.33920 | 6.49800 | 1.72916 | 54.6 | 26.327 |
| 47 | −1209.19250 | 10.00000 | | | 26.193 |
| 48 | ∞ | 95.00000 | 1.51680 | 64.2 | 24.830 |
| 49 | ∞ | BF | | | 15.500 |
| Image surface | ∞ | | | | |

TABLE 14

| | | | |
|---|---|---|---|
| Object distance | 4000.0000 | 2000.0000 | 7000.0000 |
| Object curvature radius | 5200.0000 | 2600.0000 | 9100.0000 |
| Focal length | −8.6500 | −8.6500 | −8.6500 |
| F number | −2.50004 | −2.50011 | −2.50002 |
| Half view angle | 102.0000 | 102.0000 | 102.0000 |
| Effective image radius | −15.3432 | −15.3373 | −15.3457 |
| Total lens length | 640.0350 | 640.0534 | 640.0271 |
| BF | 9.23513 | 9.25350 | 9.22719 |
| d0 | 4000.0000 | 2000.0000 | 7000.0000 |
| d14 | 5.5372 | 5.5531 | 5.5399 |
| d18 | 7.3810 | 7.3651 | 7.3783 |
| Entrance pupil position | 24.2289 | 24.2277 | 24.2287 |
| Exit pupil position | −1024.4630 | −1024.4630 | −1024.4630 |
| Front principal point | 15.5065 | 15.5053 | 15.5063 |
| Rear principal point | 648.6665 | 648.6664 | 648.6664 |

TABLE 15

| Lens elements | First surface | Focal length |
|---|---|---|
| L1 | 1 | −91.7067 |
| L2 | 3 | −46.8438 |
| L3 | 5 | −33.3197 |
| L4 | 7 | 38.5160 |
| L5 | 9 | 23.1741 |
| L6 | 11 | −16.8239 |
| L7 | 13 | 42.7663 |
| L8 | 15 | 64.4661 |
| L9 | 17 | −47.1863 |
| L10 | 19 | 72.8960 |
| L11 | 21 | 111.4017 |
| L12 | 23 | 139.1616 |
| L13 | 25 | 100.7334 |
| L14 | 27 | −30.4281 |
| L15 | 29 | 117.8181 |
| L16 | 31 | 114.6356 |
| L17 | 33 | −215.8909 |
| L18 | 36 | −139.9323 |
| L19 | 38 | 66.7157 |
| L20 | 40 | −51.0677 |
| L21 | 42 | 63.4778 |
| L22 | 44 | −180.8565 |
| L23 | 46 | 108.3543 |

Numerical Practical Example 6

Hereinafter, the lens system of numerical practical example 6 (corresponding to the sixth exemplary embodiment) is described. Table 16 shows surface data; table 17 shows various types of data; and table 18 shows single lens data.

TABLE 16

| Surface No. | r | d | nd | vd | Effective radius |
|---|---|---|---|---|---|
| Object surface | variable | variable | | | |
| 1 | 63.28360 | 3.50000 | 1.80420 | 46.5 | 40.003 |
| 2 | 32.81670 | 9.18550 | | | 27.859 |
| 3 | 51.64690 | 2.50000 | 1.80420 | 46.5 | 25.592 |
| 4 | 21.43600 | 9.53340 | | | 18.006 |
| 5 | 158.85280 | 2.00000 | 1.78637 | 48.1 | 17.178 |
| 6 | 19.00120 | 4.51400 | | | 13.418 |
| 7 | 23.46020 | 14.04160 | 1.56953 | 42.2 | 12.618 |
| 8 | −66.64780 | 3.59430 | | | 8.539 |
| 9 | −59.87690 | 15.00000 | 1.74062 | 53.1 | 4.688 |
| 10 | −12.78600 | 0.20000 | | | 8.925 |
| 11 | −12.83280 | 2.00000 | 1.81546 | 24.6 | 8.954 |
| 12 | 174.37310 | 2.14230 | | | 11.847 |
| 13 | 2743.26670 | 8.03570 | 1.60555 | 61.1 | 14.859 |
| 14 | −24.92340 | variable | | | 16.153 |
| 15 | 79.62910 | 15.00000 | 1.48834 | 70.3 | 21.802 |
| 16 | −54.40420 | 17.51190 | | | 23.174 |
| 17 | −39.81360 | 3.00000 | 1.65446 | 32.3 | 24.299 |
| 18 | 127.55140 | variable | | | 29.147 |
| 19 | −592.74720 | 11.82680 | 1.84670 | 23.8 | 31.386 |
| 20 | −54.32270 | 0.20000 | | | 32.317 |
| 21 | 774.34520 | 8.89330 | 1.84670 | 23.8 | 35.411 |
| 22 | −107.48050 | 0.20000 | | | 35.647 |
| 23 | 49.08360 | 15.00000 | 1.84670 | 23.8 | 34.085 |
| 24 | 74.45360 | 36.06340 | | | 30.629 |
| 25 | −470.22450 | 8.13880 | 1.60373 | 61.2 | 21.229 |
| 26 | −47.78860 | 1.89350 | | | 20.661 |
| 27 | −41.80810 | 2.00000 | 1.76178 | 26.4 | 19.162 |
| 28 | 50.59970 | 72.37790 | | | 18.510 |
| 29 | −1002.23960 | 8.46000 | 1.72883 | 54.7 | 31.927 |
| 30 | −79.65580 | 98.93920 | | | 32.201 |
| 31 | 164.85470 | 4.71110 | 1.84218 | 24.9 | 23.003 |
| 32 | −230.01800 | 1.21420 | | | 22.685 |
| 33 | −140.06960 | 2.00000 | 1.59196 | 60.8 | 22.599 |
| 34 | 2040.72340 | 32.78750 | | | 22.421 |
| 35(aperture) | ∞ | 61.88290 | | | 20.397 |
| 36 | 156.14880 | 2.00000 | 1.80550 | 29.4 | 20.884 |
| 37 | 64.08780 | 4.25350 | | | 20.885 |
| 38 | 146.26200 | 8.84000 | 1.55032 | 75.5 | 21.609 |
| 39 | −48.32820 | 0.62760 | | | 21.878 |
| 40 | −51.45690 | 2.00000 | 1.80458 | 27.5 | 21.810 |
| 41 | 220.04910 | 0.20000 | | | 23.166 |
| 42 | 105.36540 | 10.92740 | 1.55032 | 75.5 | 23.896 |
| 43 | −50.52690 | 0.90500 | | | 24.220 |
| 44 | −47.73520 | 2.50000 | 1.80519 | 28.9 | 24.198 |
| 45 | −76.05490 | 0.20000 | | | 25.293 |
| 46 | 94.94220 | 6.68120 | 1.72968 | 54.6 | 26.412 |
| 47 | −371.30530 | 10.00000 | | | 26.320 |
| 48 | ∞ | 95.00000 | 1.51680 | 64.2 | 24.866 |
| 49 | ∞ | BF | | | 15.500 |
| Image surface | ∞ | | | | |

TABLE 17

| | | | |
|---|---|---|---|
| Object distance | 4000.0000 | 2000.0000 | 7000.0000 |
| Object curvature radius | 5200.0000 | 2600.0000 | 9100.0000 |
| Focal length | −8.6500 | −8.6499 | −8.6500 |
| F number | −2.50006 | −2.50013 | −2.50003 |
| Half view angle | 102.0000 | 102.0000 | 102.0000 |
| Effective image radius | −15.3432 | −15.3372 | −15.3457 |
| Total lens length | 640.0345 | 640.0529 | 640.0265 |
| BF | 9.23470 | 9.25308 | 9.22675 |
| d0 | 4000.0000 | 2000.0000 | 7000.0000 |
| d14 | 1.9847 | 2.0000 | 1.9817 |
| d18 | 6.3331 | 6.3178 | 6.3360 |
| Entrance pupil position | 23.5648 | 23.5632 | 23.5651 |
| Exit pupil position | −1037.1156 | −1037.1156 | −1037.1156 |
| Front principal point | 14.8433 | 14.8418 | 14.8435 |
| Rear principal point | 648.6659 | 648.6658 | 648.6658 |

TABLE 18

| Lens elements | First surface | Focal length |
|---|---|---|
| L1 | 1 | -89.3350 |
| L2 | 3 | -47.3132 |
| L3 | 5 | -27.6200 |
| L4 | 7 | 32.2939 |
| L5 | 9 | 19.3314 |
| L6 | 11 | -14.5881 |
| L7 | 13 | 40.8322 |
| L8 | 15 | 68.7089 |
| L9 | 17 | -46.0362 |
| L10 | 19 | 69.9269 |
| L11 | 21 | 111.9863 |
| L12 | 23 | 133.8437 |
| L13 | 25 | 87.4760 |
| L14 | 27 | -29.7733 |
| L15 | 29 | 118.2723 |
| L16 | 31 | 114.6509 |
| L17 | 33 | -221.3479 |
| L18 | 36 | -136.2704 |
| L19 | 38 | 67.0894 |
| L20 | 40 | -51.6645 |
| L21 | 42 | 63.6387 |
| L22 | 44 | -165.7400 |
| L23 | 46 | 104.2494 |

Numerical Practical Example 7

Hereinafter, the lens system of numerical practical example 7 (corresponding to the seventh exemplary embodiment) is described. Table 19 shows surface data; table 20 shows various types of data; and table 21 shows single lens data.

TABLE 19

| Surface No. | r | d | nd | vd | Effective radius |
|---|---|---|---|---|---|
| Object surface | variable | variable | | | |
| 1 | 64.29010 | 3.50000 | 1.80420 | 46.5 | 40.000 |
| 2 | 32.48960 | 9.31610 | | | 27.633 |
| 3 | 52.89940 | 2.50000 | 1.80420 | 46.5 | 25.561 |
| 4 | 21.33780 | 9.27870 | | | 17.956 |
| 5 | 126.87940 | 2.00000 | 1.77252 | 49.4 | 17.203 |
| 6 | 18.55970 | 4.61010 | | | 13.427 |
| 7 | 22.88660 | 15.00000 | 1.54903 | 46.3 | 12.650 |
| 8 | -64.84610 | 4.15950 | | | 8.246 |
| 9 | -66.36510 | 15.00000 | 1.72920 | 54.7 | 4.633 |
| 10 | -13.69560 | 0.61610 | | | 9.475 |
| 11 | -13.60410 | 2.00000 | 1.83688 | 24.0 | 9.557 |
| 12 | 284.15600 | 1.82320 | | | 12.619 |
| 13 | 984.51480 | 8.14890 | 1.62200 | 60.2 | 15.478 |
| 14 | -26.41060 | variable | | | 16.738 |
| 15 | 93.53510 | 9.73660 | 1.50466 | 68.5 | 22.098 |
| 16 | -53.10820 | 19.14100 | | | 22.533 |
| 17 | -36.28870 | 3.00000 | 1.66034 | 31.8 | 23.850 |
| 18 | 161.00310 | variable | | | 29.252 |
| 19 | -329.56540 | 12.52760 | 1.84670 | 23.8 | 31.455 |
| 20 | -49.81420 | 0.20000 | | | 32.465 |
| 21 | 298.52510 | 8.98000 | 1.84670 | 23.8 | 36.160 |
| 22 | -140.27760 | 0.20000 | | | 36.314 |
| 23 | 49.60470 | 15.00000 | 1.84670 | 23.8 | 34.686 |
| 24 | 71.48560 | 37.13650 | | | 31.098 |
| 25 | -554.12230 | 10.48350 | 1.68855 | 40.6 | 21.671 |
| 26 | -51.06390 | 2.19460 | | | 20.797 |
| 27 | -42.22300 | 2.00000 | 1.81709 | 24.6 | 19.201 |
| 28 | 57.80090 | 72.17000 | | | 18.687 |
| 29 | -1426.62310 | 8.18820 | 1.72592 | 54.8 | 31.871 |
| 30 | -82.05000 | 95.88350 | | | 32.110 |
| 31 | 165.90130 | 4.72860 | 1.84346 | 24.2 | 22.919 |
| 32 | -226.14270 | 1.22100 | | | 22.821 |
| 33 | -138.29940 | 2.00000 | 1.59048 | 49.4 | 22.731 |
| 34 | 2751.39050 | 34.91980 | | | 22.540 |
| 35(aperture) | ∞ | 60.52210 | | | 20.248 |
| 36 | 165.52210 | 2.00000 | 1.80380 | 31.4 | 20.683 |

TABLE 19-continued

| Surface No. | r | d | nd | vd | Effective radius |
|---|---|---|---|---|---|
| 37 | 65.24950 | 4.33660 | | | 20.704 |
| 38 | 165.65600 | 8.73170 | 1.55032 | 75.5 | 21.425 |
| 39 | -46.79220 | 0.63580 | | | 21.709 |
| 40 | -49.66690 | 2.00000 | 1.80382 | 27.9 | 21.644 |
| 41 | 280.49290 | 0.20000 | | | 23.038 |
| 42 | 111.58540 | 10.87720 | 1.55032 | 75.5 | 23.792 |
| 43 | -49.24810 | 0.96520 | | | 24.120 |
| 44 | -46.23250 | 2.50000 | 1.80573 | 28.3 | 24.097 |
| 45 | -77.15290 | 0.20000 | | | 25.284 |
| 46 | 99.33380 | 6.97460 | 1.72987 | 54.6 | 26.501 |
| 47 | -254.94490 | 10.00000 | | | 26.436 |
| 48 | ∞ | 95.00000 | 1.51680 | 64.2 | 24.915 |
| 49 | ∞ | BF | | | 15.500 |
| Image surface | ∞ | | | | |

TABLE 20

| | | | |
|---|---|---|---|
| Object distance | 4000.0000 | 2000.0000 | 7000.0000 |
| Object curvature radius | 5200.0000 | 2600.0000 | 9100.0000 |
| Focal length | -8.6500 | -8.6499 | -8.6500 |
| F number | -2.50006 | -2.50013 | -2.50003 |
| Half view angle | 102.0000 | 102.0000 | 102.0000 |
| Effective image radius | -15.3432 | -15.3372 | -15.3457 |
| Focal length | -8.6497 | -8.6497 | -8.6497 |
| F number | -2.50004 | -2.50010 | -2.50001 |
| Half view angle | 102.0000 | 102.0000 | 102.0000 |
| Effective image radius | -15.3436 | -15.3379 | -15.3460 |
| Total lens length | 640.0344 | 640.0528 | 640.0265 |
| BF | 9.23441 | 9.25279 | 9.22647 |
| d0 | 4000.0000 | 2000.0000 | 7000.0000 |
| d14 | 1.9902 | 2.0000 | 1.9859 |
| d18 | 6.2037 | 6.1939 | 6.2080 |
| Entrance pupil position | 23.3342 | 23.3331 | 23.3346 |
| Exit pupil position | -1024.3080 | -1024.3080 | -1024.3080 |
| Front principal point | 14.6121 | 14.6110 | 14.6126 |
| Rear principal point | 648.6655 | 648.6655 | 648.6655 |

TABLE 21

| Lens elements | First surface | Focal length |
|---|---|---|
| L1 | 1 | -85.8888 |
| L2 | 3 | -46.0986 |
| L3 | 5 | -28.3695 |
| L4 | 7 | 32.7984 |
| L5 | 9 | 21.1280 |
| L6 | 11 | -15.4657 |
| L7 | 13 | 41.4799 |
| L8 | 15 | 68.6526 |
| L9 | 17 | -44.5767 |
| L10 | 19 | 67.9152 |
| L11 | 21 | 113.7796 |
| L12 | 23 | 145.6292 |
| L13 | 25 | 81.0014 |
| L14 | 27 | -29.5953 |
| L15 | 29 | 119.6191 |
| L16 | 31 | 114.0867 |
| L17 | 33 | -222.9485 |
| L18 | 36 | -135.2019 |
| L19 | 38 | 67.2810 |
| L20 | 40 | -52.3523 |
| L21 | 42 | 63.6145 |
| L22 | 44 | -148.5326 |
| L23 | 46 | 98.7592 |

Numerical Practical Example 8

Hereinafter, the lens system of numerical practical example 8 (corresponding to the eighth exemplary embodiment) is described. Table 22 shows surface data; table 23 shows various types of data; and table 24 shows single lens data.

TABLE 22

| Surface No. | r | d | nd | vd | Effective radius |
|---|---|---|---|---|---|
| Object surface | ∞ | | | | |
| 1 | 7.93240 | 1.00000 | 2.05090 | 26.9 | 5.449 |
| 2 | 4.45760 | 1.50350 | | | 3.660 |
| 3 | 5.05190 | 0.50000 | 2.05090 | 26.9 | 2.404 |
| 4 | 2.09070 | 0.93030 | | | 1.606 |
| 5 | 37.69890 | 1.26120 | 1.77040 | 48.3 | 1.343 |
| 6 | −1.74860 | 0.50000 | 1.75900 | 29.4 | 1.156 |
| 7 | 35.35180 | 0.34100 | | | 1.706 |
| 8 | −30.09070 | 2.54720 | 1.49700 | 81.6 | 2.206 |
| 9 | −3.49500 | 0.15000 | | | 2.998 |
| 10 | −40.42400 | 2.32370 | 1.49700 | 81.6 | 3.970 |
| 11 | −6.35630 | 0.15000 | | | 4.307 |
| 12 | −39.25360 | 2.13030 | 1.67393 | 57.2 | 4.601 |
| 13 | −7.81470 | 0.82060 | | | 4.730 |
| 14 | −6.05640 | 0.50000 | 1.83620 | 26.9 | 4.674 |
| 15 | −8.38510 | 0.14990 | | | 5.057 |
| 16 | 24.19860 | 1.57820 | 1.71554 | 55.1 | 5.317 |
| 17 | −77.98920 | 0.14980 | | | 5.291 |
| 18 | 8.35920 | 2.74840 | 1.84637 | 23.8 | 5.075 |
| 19 | −51.72980 | 0.74580 | | | 4.763 |
| 20 | −14.34690 | 7.00000 | 1.83654 | 24.0 | 4.467 |
| 21 | −58.69460 | 1.86730 | | | 3.315 |
| 22 | −4.71340 | 0.71670 | 1.51986 | 67.0 | 3.122 |
| 23 | −7.17560 | 0.15000 | | | 3.290 |
| 24 | −7.83070 | 0.84260 | 1.59253 | 61.8 | 3.284 |
| 25 | 12.37460 | 3.58760 | | | 3.598 |
| 26 | −15.11890 | 2.03240 | 1.81727 | 28.8 | 4.728 |
| 27 | −7.81480 | 0.44410 | | | 5.102 |
| 28 | 25.94870 | 3.00000 | 1.80384 | 36.4 | 5.423 |
| 29 | −13.90070 | 0.67630 | | | 5.376 |
| 30 | 9.50560 | 1.59890 | 1.78487 | 48.2 | 4.058 |
| 31 | 20.19110 | 1.63620 | | | 3.570 |
| 32 | −8.46580 | 0.87270 | 1.80875 | 29.6 | 2.925 |
| 33 | 4.11600 | 1.89360 | 1.49685 | 64.5 | 2.594 |
| 34 | 28.28470 | 1.00050 | | | 2.581 |
| 35 | 11.25950 | 1.52620 | 1.83469 | 24.1 | 2.613 |
| 36 | −8.29880 | 0.15170 | | | 2.537 |
| 37 | 40.92670 | 0.50170 | 1.60869 | 36.7 | 2.210 |
| 38 | 4.54690 | 0.35460 | | | 1.921 |
| 39 | 6.34570 | 1.49210 | 1.72250 | 54.9 | 1.867 |
| 40 | −3.65670 | 0.50020 | 1.73175 | 27.7 | 1.638 |
| 41 | 4.81530 | 0.39890 | | | 1.344 |
| 42(aperture) | ∞ | 0.15070 | | | 1.289 |
| 43 | 4.05190 | 2.35840 | 1.84113 | 23.9 | 1.472 |
| 44 | 2.55100 | 1.86970 | 1.49700 | 81.6 | 1.519 |
| 45 | −11.58400 | 1.27610 | | | 1.781 |
| 46 | 4.76050 | 2.05810 | 1.72932 | 54.5 | 2.261 |
| 47 | 5.10650 | 1.00000 | | | 2.072 |
| 48 | ∞ | 0.80000 | 1.51680 | 64.2 | 2.161 |
| 49 | ∞ | BF | | | 2.244 |
| Image surface | ∞ | | | | |

TABLE 23

| | |
|---|---|
| Focal length | −1.3989 |
| F number | −2.90140 |
| Half view angle | 100.0000 |
| Effective image radius | −2.4385 |
| Total lens length | 62.9694 |
| BF | 0.00613 |
| Entrance pupil position | 3.2173 |
| Exit pupil position | −7.0745 |
| Front principal point | 1.5420 |
| Rear principal point | 64.3683 |

TABLE 24

| Lens elements | First surface | Focal length |
|---|---|---|
| L1 | 1 | −11.3580 |
| L2 | 3 | −3.7155 |
| L3 | 5 | 2.1997 |
| L4 | 6 | −2.1826 |
| L5 | 8 | 7.7112 |
| L6 | 10 | 14.8396 |
| L7 | 12 | 14.0936 |
| L8 | 14 | −28.9059 |
| L9 | 16 | 25.9777 |
| L10 | 18 | 8.6847 |
| L11 | 20 | −24.4569 |
| L12 | 22 | −29.3445 |
| L13 | 24 | −7.9702 |
| L14 | 26 | 17.5914 |
| L15 | 28 | 11.6515 |
| L16 | 30 | 21.4721 |
| L17 | 32 | −3.3214 |
| L18 | 33 | 9.4493 |
| L19 | 35 | 5.9344 |
| L20 | 37 | −8.4477 |
| L21 | 39 | 3.4252 |
| L22 | 40 | −2.7712 |
| L23 | 43 | −29.0202 |
| L24 | 44 | 4.3997 |
| L25 | 46 | 27.4566 |

Numerical Practical Example 9

Hereinafter, the lens system of numerical practical example 9 (corresponding to the ninth exemplary embodiment) is described. Table 25 shows surface data; table 26 shows various types of data; and table 27 shows single lens data.

TABLE 25

| Surface No. | r | d | nd | vd | Effective radius |
|---|---|---|---|---|---|
| Object surface | ∞ | | | | |
| 1 | 7.61010 | 1.00000 | 2.00100 | 29.1 | 5.455 |
| 2 | 4.45910 | 1.10470 | | | 3.691 |
| 3 | 4.44760 | 0.50020 | 2.00100 | 29.1 | 2.739 |
| 4 | 2.01120 | 1.24310 | | | 1.755 |
| 5 | −182.15840 | 1.67880 | 1.76458 | 50.3 | 1.424 |
| 6 | −2.56500 | 0.50800 | 1.82600 | 25.3 | 1.149 |
| 7 | −19.21760 | 0.25510 | | | 1.568 |
| 8 | −14.08940 | 2.09080 | 1.49700 | 81.6 | 1.869 |
| 9 | −3.61530 | 0.19040 | | | 2.678 |
| 10 | −34.82460 | 1.75800 | 1.49700 | 81.6 | 3.466 |
| 11 | −6.76600 | 0.20530 | | | 3.801 |
| 12 | −57.50340 | 1.90120 | 1.71401 | 55.3 | 4.207 |
| 13 | −7.94150 | 0.87430 | | | 4.371 |
| 14 | −5.78970 | 0.76980 | 1.82830 | 29.9 | 4.354 |
| 15 | −9.15280 | 0.32570 | | | 4.907 |
| 16 | 28.69500 | 1.68360 | 1.80420 | 46.5 | 5.502 |
| 17 | −42.30770 | 0.25150 | | | 5.541 |
| 18 | 8.59570 | 2.71770 | 1.84670 | 23.8 | 5.497 |
| 19 | 431.81660 | 0.65300 | | | 5.221 |
| 20 | −30.07740 | 6.99470 | 1.77093 | 31.8 | 5.071 |
| 21 | 342.86640 | 2.09890 | | | 3.439 |
| 22 | −5.07130 | 0.81070 | 1.68341 | 56.7 | 3.196 |
| 23 | −6.26680 | 0.40990 | | | 3.374 |
| 24 | −6.79400 | 0.86100 | 1.63030 | 59.7 | 3.313 |
| 25 | 12.52510 | 3.55410 | | | 3.638 |
| 26 | −14.36660 | 1.98270 | 1.80621 | 29.4 | 4.753 |
| 27 | −7.65130 | 0.59260 | | | 5.114 |
| 28 | 35.42240 | 3.00000 | 1.80044 | 46.8 | 5.480 |
| 29 | −12.64390 | 0.80130 | | | 5.477 |
| 30 | 9.39700 | 1.61920 | 1.78465 | 48.2 | 4.037 |
| 31 | 20.73920 | 1.64070 | | | 3.548 |
| 32 | −7.96460 | 1.27270 | 1.80858 | 34.3 | 2.912 |
| 33 | 4.22410 | 1.79770 | 1.49697 | 69.3 | 2.566 |
| 34 | 36.02480 | 0.93990 | | | 2.564 |

TABLE 25-continued

| Surface No. | r | d | nd | vd | Effective radius |
|---|---|---|---|---|---|
| 35 | 12.74670 | 1.47220 | 1.83456 | 24.6 | 2.600 |
| 36 | −7.83480 | 0.15000 | | | 2.539 |
| 37 | 37.10390 | 0.50120 | 1.60758 | 36.7 | 2.205 |
| 38 | 4.59710 | 0.34140 | | | 1.923 |
| 39 | 6.47230 | 1.50810 | 1.72319 | 54.9 | 1.873 |
| 40 | −3.48000 | 0.50000 | 1.73123 | 28.3 | 1.650 |
| 41 | 4.78450 | 0.38870 | | | 1.352 |
| 42(aperture) | ∞ | 0.21190 | | | 1.302 |
| 43 | 4.00370 | 2.39900 | 1.84670 | 23.8 | 1.525 |
| 44 | 2.53690 | 1.97170 | 1.49700 | 81.6 | 1.544 |
| 45 | −11.03860 | 1.21300 | | | 1.816 |
| 46 | 4.79570 | 2.07570 | 1.73293 | 54.1 | 2.260 |
| 47 | 4.86090 | 1.00000 | | | 2.060 |
| 48 | ∞ | 0.80000 | 1.51680 | 64.2 | 2.153 |
| 49 | ∞ | BF | | | 2.243 |
| Image surface | ∞ | | | | |

TABLE 26

| | |
|---|---|
| Focal length | −1.3990 |
| F number | −2.90155 |
| Half view angle | 100.0000 |
| Effective image radius | −2.4436 |
| Total lens length | 63.7980 |
| BF | 0.00442 |
| Entrance pupil position | 3.0098 |
| Exit pupil position | −7.0169 |
| Front principal point | 1.3320 |
| Rear principal point | 65.1970 |

TABLE 27

| Lens elements | First surface | Focal length |
|---|---|---|
| L1 | 1 | −12.7889 |
| L2 | 3 | −4.0875 |
| L3 | 5 | 3.3890 |
| L4 | 6 | −3.6338 |
| L5 | 8 | 9.1769 |
| L6 | 10 | 16.5522 |
| L7 | 12 | 12.7016 |
| L8 | 14 | −21.2241 |
| L9 | 16 | 21.4883 |
| L10 | 18 | 10.3278 |
| L11 | 20 | −35.5773 |
| L12 | 22 | −53.6750 |
| L13 | 24 | −6.8699 |
| L14 | 26 | 17.9396 |
| L15 | 28 | 11.9733 |
| L16 | 30 | 20.6049 |
| L17 | 32 | −3.2614 |
| L18 | 33 | 9.4514 |
| L19 | 35 | 6.0098 |
| L20 | 37 | −8.6869 |
| L21 | 39 | 3.3419 |
| L22 | 40 | −2.6865 |
| L23 | 43 | −32.6978 |
| L24 | 44 | 4.3608 |
| L25 | 46 | 33.7246 |

Numerical Practical Example 10

Hereinafter, the lens system of numerical practical example 10 (corresponding to the tenth exemplary embodiment) is described. Table 28 shows surface data; table 29 shows various types of data; and table 30 shows single lens data.

TABLE 28

| Surface No. | r | d | nd | vd | Effective radius |
|---|---|---|---|---|---|
| Object surface | ∞ | | | | |
| 1 | 6.42470 | 0.70000 | 2.00100 | 29.1 | 4.001 |
| 2 | 3.33470 | 1.07320 | | | 2.689 |
| 3 | 4.51070 | 0.50000 | 2.00100 | 29.1 | 2.042 |
| 4 | 1.78460 | 1.09690 | | | 1.348 |
| 5 | 30.10470 | 1.40000 | 1.80420 | 46.5 | 0.821 |
| 6 | −1.15540 | 1.50000 | 1.74077 | 27.8 | 0.819 |
| 7 | −35.29750 | 0.50970 | | | 1.689 |
| 8 | −5.29520 | 1.59500 | 1.80420 | 46.5 | 1.894 |
| 9 | −3.17420 | 0.15000 | | | 2.442 |
| 10 | −54.42590 | 1.63070 | 1.80420 | 46.5 | 2.902 |
| 11 | −5.68200 | 0.89790 | | | 3.082 |
| 12 | −3.72210 | 0.50000 | 1.64769 | 33.8 | 3.063 |
| 13 | −5.05350 | 1.70010 | | | 3.403 |
| 14 | 25.93710 | 1.50000 | 1.84666 | 23.8 | 3.984 |
| 15 | −21.06840 | 23.52770 | | | 4.001 |
| 16 | 53.36830 | 1.50000 | 1.83481 | 42.7 | 4.001 |
| 17 | −22.45170 | 3.96820 | | | 3.973 |
| 18 | −6.25070 | 1.00000 | 1.72916 | 54.7 | 3.264 |
| 19 | 19.24970 | 2.50000 | 1.71736 | 29.5 | 3.586 |
| 20 | −9.08540 | 2.75300 | | | 3.781 |
| 21 | 6.43160 | 1.73300 | 1.80420 | 46.5 | 3.439 |
| 22 | 80.75310 | 2.74940 | | | 3.191 |
| 23 | −23.20460 | 0.50000 | 1.76182 | 26.6 | 1.675 |
| 24 | 3.93720 | 0.44940 | | | 1.541 |
| 25 | 19.07260 | 1.40040 | 1.72916 | 54.7 | 1.553 |
| 26 | −2.50840 | 0.50000 | 1.80518 | 25.5 | 1.554 |
| 27 | −26.19940 | 0.15000 | | | 1.593 |
| 28(aperture) | ∞ | 0.15000 | | | 1.597 |
| 29 | 4.79790 | 0.50000 | 1.91082 | 35.2 | 1.609 |
| 30 | 3.62840 | 1.26020 | 1.48749 | 70.4 | 1.528 |
| 31 | −9.08010 | 0.93920 | | | 1.491 |
| 32 | 9.81180 | 2.00000 | 1.72916 | 54.7 | 1.555 |
| 33 | 17.66240 | 1.00000 | | | 1.484 |
| 34 | ∞ | 3.60000 | 1.51680 | 64.2 | 1.482 |
| 35 | ∞ | BF | | | 1.478 |
| Image surface | ∞ | | | | |

| | |
|---|---|
| Focal length | −0.8914 |
| F number | −2.08038 |
| Half view angle | 95.0000 |
| Effective image radius | −1.4794 |
| Total lens length | 67.3900 |
| BF | 0.45603 |
| Entrance pupil position | 2.4843 |
| Exit pupil position | −6.7255 |
| Front principal point | 1.4822 |
| Rear principal point | 68.2814 |

TABLE 30

| Lens elements | First surface | Focal length |
|---|---|---|
| L1 | 1 | −7.8118 |
| L2 | 3 | −3.2479 |
| L3 | 5 | 1.4118 |
| L4 | 6 | −1.6432 |
| L5 | 8 | 7.3802 |
| L6 | 10 | 7.7731 |
| L7 | 12 | −25.5901 |
| L8 | 14 | 13.9346 |
| L9 | 16 | 19.1024 |
| L10 | 18 | −6.3659 |
| L11 | 19 | 8.9333 |
| L12 | 21 | 8.6002 |
| L13 | 23 | −4.3835 |
| L14 | 25 | 3.1258 |
| L15 | 26 | −3.4779 |
| L16 | 29 | −20.5260 |

TABLE 30-continued

| Lens elements | First surface | Focal length |
|---|---|---|
| L17 | 30 | 5.4966 |
| L18 | 32 | 27.3374 |

Numerical Practical Example 11

Hereinafter, the lens system of numerical practical example 11 (corresponding to the eleventh exemplary embodiment) is described. Table 31 shows surface data; table 32 shows various types of data; and table 33 shows single lens data.

TABLE 31

| Surface No. | r | d | nd | vd | Effective radius |
|---|---|---|---|---|---|
| Object surface | ∞ | | | | |
| 1 | 6.42800 | 0.70000 | 2.00100 | 29.1 | 4.001 |
| 2 | 3.33640 | 1.06390 | | | 2.690 |
| 3 | 4.44320 | 0.50000 | 2.00100 | 29.1 | 2.043 |
| 4 | 1.79130 | 1.10160 | | | 1.352 |
| 5 | 32.22280 | 1.40000 | 1.80420 | 46.5 | 0.810 |
| 6 | −1.16780 | 1.50000 | 1.74446 | 27.1 | 0.826 |
| 7 | −31.39330 | 0.50850 | | | 1.702 |
| 8 | −5.32800 | 1.60360 | 1.80420 | 46.5 | 1.909 |
| 9 | −3.19420 | 0.15000 | | | 2.459 |
| 10 | −59.49740 | 1.63820 | 1.80420 | 46.5 | 2.927 |
| 11 | −5.76310 | 0.90300 | | | 3.107 |
| 12 | −3.76490 | 0.50000 | 1.62004 | 35.4 | 3.088 |
| 13 | −5.26140 | 1.36580 | | | 3.436 |
| 14 | 24.59900 | 1.50000 | 1.84670 | 23.8 | 3.982 |
| 15 | −21.00820 | 23.64910 | | | 3.999 |
| 16 | 57.64090 | 1.50000 | 1.81170 | 39.5 | 4.004 |
| 17 | −21.73130 | 4.07190 | | | 3.981 |
| 18 | −6.17250 | 1.00000 | 1.72915 | 54.7 | 3.279 |
| 19 | 26.48060 | 2.50000 | 1.71826 | 29.0 | 3.613 |
| 20 | −8.89840 | 2.87560 | | | 3.827 |
| 21 | 6.45990 | 1.75690 | 1.80391 | 46.5 | 3.484 |
| 22 | 86.94070 | 2.76600 | | | 3.236 |
| 23 | −20.99570 | 0.50000 | 1.76551 | 26.3 | 1.697 |
| 24 | 4.02680 | 0.45690 | | | 1.563 |
| 25 | 21.73540 | 1.40710 | 1.72914 | 54.7 | 1.575 |
| 26 | −2.53210 | 0.50000 | 1.80927 | 24.8 | 1.579 |
| 27 | −21.03420 | 0.15000 | | | 1.623 |
| 28(aperture) | ∞ | 0.15000 | | | 1.626 |
| 29 | 4.96320 | 0.50000 | 1.81082 | 40.2 | 1.637 |
| 30 | 3.67160 | 1.45060 | 1.48700 | 70.4 | 1.557 |
| 31 | −9.42020 | 0.97430 | | | 1.507 |

TABLE 31-continued

| Surface No. | r | d | nd | vd | Effective radius |
|---|---|---|---|---|---|
| 32 | 9.86120 | 2.00000 | 1.68517 | 56.6 | 1.564 |
| 33 | 17.31120 | 1.00000 | | | 1.492 |
| 34 | ∞ | 3.60000 | 1.51680 | 64.2 | 1.488 |
| 35 | ∞ | BF | | | 1.479 |
| Image surface | ∞ | | | | |

TABLE 32

| | |
|---|---|
| Focal length | −0.8914 |
| F number | −2.08109 |
| Half view angle | 95.0000 |
| Effective image radius | −1.4791 |
| Total lens length | 67.6925 |
| BF | 0.44950 |
| Entrance pupil position | 2.4780 |
| Exit pupil position | −6.9533 |
| Front principal point | 1.4793 |
| Rear principal point | 68.5839 |

TABLE 33

| Lens elements | First surface | Focal length |
|---|---|---|
| L1 | 1 | −7.8152 |
| L2 | 3 | −3.3105 |
| L3 | 5 | 1.4280 |
| L4 | 6 | −1.6645 |
| L5 | 8 | 7.4290 |
| L6 | 10 | 7.8285 |
| L7 | 12 | −24.4780 |
| L8 | 14 | 13.5876 |
| L9 | 16 | 19.6085 |
| L10 | 18 | −6.7776 |
| L11 | 19 | 9.5550 |
| L12 | 21 | 8.5969 |
| L13 | 23 | −4.3759 |
| L14 | 25 | 3.1883 |
| L15 | 26 | −3.6006 |
| L16 | 29 | −21.0492 |
| L17 | 30 | 5.6291 |
| L18 | 32 | 30.1516 |

Table 34 below shows corresponding values of each condition in the lens systems of the numerical practical examples.

TABLE 34

| | Numerical practical examples | | | | | | | | | | |
|---|---|---|---|---|---|---|---|---|---|---|---|
| Conditions | 1 | 2 | 3 | 4 | 5 | 6 | 7 | 8 | 9 | 10 | 11 |
| (1) | 0.38 | 0.36 | 0.29 | 0.34 | 0.29 | 0.30 | 0.29 | 0.56 | 0.59 | 0.19 | 0.19 |
| (2) | −1.00 | −1.00 | −1.04 | −1.04 | −1.38 | −1.38 | −1.38 | −1.31 | −1.31 | −1.15 | −1.15 |
| (3) | 1.54 | 1.54 | 0.86 | 0.84 | 0.83 | 0.75 | 0.75 | 1.06 | 1.21 | 1.41 | 1.43 |
| (4) | 97.3 | 97.3 | 113.7 | 113.7 | 131.7 | 131.7 | 131.7 | 78.6 | 79.6 | 125.3 | 125.9 |
| (5) | 1.85 | 1.90 | 0.35 | 0.33 | 0.52 | 0.52 | 0.53 | 0.67 | 0.89 | 1.23 | 1.24 |
| (6) | 63.1 | 64.8 | 84.5 | 84.8 | 96.1 | 96.2 | 96.3 | 49.6 | 50.8 | 92.1 | 92.8 |
| (7) | 3.42 | 3.34 | 3.67 | 3.02 | 3.60 | 3.15 | 3.04 | 3.57 | 3.83 | 3.16 | 3.16 |
| (8) | 61.4 | 163.9 | 72.4 | 80.4 | 356.1 | 422.9 | 90.0 | | | | |
| (9) | 5.84 | 6.04 | 6.32 | 5.85 | 5.96 | 5.80 | 5.58 | 4.65 | 5.24 | 5.29 | 5.29 |
| (10) | 1.03 | 1.06 | 1.12 | 1.06 | 1.11 | 1.12 | 1.10 | 1.02 | 0.99 | 1.00 | 1.00 |

OTHER EXEMPLARY EMBODIMENTS

In the exemplary embodiments first through eleventh described above, the description is made of the case where the lens system of the present disclosure is used for a projector. Besides, the lens system of the present disclosure, by being combined with an imaging element that photoreceives an optical image formed by the lens system and converts the image to an electrical image signal, can be used for an imaging apparatus.

INDUSTRIAL APPLICABILITY

The present disclosure can be applied to image projection apparatuses such as projectors and head up displays, and imaging apparatuses such as digital still cameras, digital video cameras, surveillance cameras in surveillance systems, web cameras, in-vehicle cameras, and the like. In particular, the present disclosure can be applied to a photographic optical system that requires high image quality such as a projector, a digital still camera system, and a digital video camera system.

What is claimed is:

1. A lens system that forms an image conjugately between each of a magnification conjugate point at a magnification side and a reduction conjugate point at a reduction side; and an intermediate image-forming position inside the lens system, the lens system comprising:
   a magnification optical system with positive power, the magnification optical system having a plurality of lens elements, the magnification optical system positioned closer to the magnification side than the intermediate image-forming position; and
   a relay optical system with positive power, the relay optical system having a plurality of lens elements, the relay optical system positioned closer to the reduction side than the intermediate image-forming position,
   wherein the plurality of lens elements of the relay optical system are the only lens elements located between the intermediate image-forming position and the reduction conjugate point, and
   wherein the lens system satisfies following conditions (1) and (2)

$$0.08 \leq fp/fr \leq 0.8 \tag{1}$$

$$\{Y\max - ft \cdot \tan(\omega\max)\}/\{ft \cdot \tan(\omega\max)\} \leq -0.3 \tag{2}$$

where
fr is composite focal length of the relay optical system closer to the reduction side than the intermediate image-forming position,
fp is composite focal length of the magnification optical system closer to the magnification side than the intermediate image-forming position,
Ymax is a radius of an effective image, and is a negative value,
ωmax is a maximum half view angle, and
ft is focal length of the lens system as a whole.

2. The lens system of claim 1,
wherein the magnification optical system includes a rear group and a front group,
the rear group being defined as a lens group which includes at least one lens element with positive power disposed closest to the magnification side in the magnification optical system within the rear group and lens elements disposed on the reduction side with respect to the one lens element with positive power,
the front group being defined as a lens group disposed on the magnification side of the magnification optical system with respect to the one lens elements with positive power of the rear group, the front group including at least one lens element with negative power, and
wherein the lens system satisfies following condition (3)

$$0.4 \leq fpf/(ft \cdot \omega\max \cdot \pi/180) \leq 1.8 \tag{3}$$

where
fpf is composite focal length of the front group of the magnification optical system.

3. The lens system of claim 1, satisfying following condition (4)

$$60 < |(Lt \cdot ft \cdot \omega\max \cdot \pi/180)/ft^2| < 200 \tag{4}$$

where
Lt is a length from a most magnification side lens surface to an image plane.

4. The lens system of claim 1,
wherein the magnification optical system includes a rear group and a front group,
the rear group being defined as a lens group which includes at least one lens element with positive power disposed closest to the magnification side in the magnification optical system within the rear group and lens elements disposed on the reduction side with respect to the one lens element with positive power,
the front group being defined as a lens group disposed on the magnification side of the magnification optical system with respect to the one lens elements with positive power, the front group including at least one lens element with negative power, and
wherein the lens system satisfies following condition (5)

$$|t/ft| \leq 3.0 \tag{5}$$

where
t is distance on an optical axis between a surface of a lens element closest to the reduction side among the front group of the magnification optical system and a surface of a lens element closest to the magnification side among the rear group of the magnification optical system.

5. The lens system of claim 1, wherein the lens system satisfies following condition (6)

$$36 < |(Lr \cdot ft \cdot \omega\max \cdot \pi/180)/ft^2| < 150 \tag{6}$$

where
Lr is distance on an optical axis from the intermediate image-forming position to an image-forming position at the reduction side.

6. The lens system of claim 1, wherein the front group of the magnification optical system includes a first lens element and a second lens element in order from the magnification side to the reduction side,
the first lens element having a negative power and having a meniscus shape with a convex surface facing the magnification side,
the second lens element having a negative power and having a meniscus shape with a convex surface facing the magnification side.

7. The lens system of claim 1, wherein the lens system satisfies following condition (7)

$$2.9 < SFL1 < 5.0 \tag{7}$$

where
SFL1 is a shape factor of a lens element closest to the magnification side in the lens system.

8. The lens system of claim 1,
wherein the magnification optical system includes a rear group and a front group,
the rear group being defined as a lens group which includes at least one lens element with positive power disposed closest to the magnification side in the magnification optical system within the rear group and lens elements disposed on the reduction side with respect to the one lens element with positive power,
the front group being defined as a lens group disposed on the magnification side of the magnification optical system with respect to the one lens elements with positive power of the rear group, the front group including at least one lens element with negative power, and
wherein the lens system satisfies following condition (10)

$$0.8 < \varphi pfmax/\varphi prmax < 1.3 \qquad (10)$$

where
$\varphi pfmax$ is a maximum lens effective diameter of a lens element in the front group of the magnification optical system, and
$\varphi prmax$ is a maximum lens effective diameter of a lens element in the rear group of the magnification optical system.

9. An image projection apparatus comprising:
the lens system of claim 1; and
an image-forming element generating an image to be projected onto a screen.

10. An imaging apparatus comprising:
the lens system of claim 1; and
an imaging element photoreceiving an optical image formed by the lens system and converting the optical image to an electrical image signal.

* * * * *